United States Patent
Natarajan et al.

(10) Patent No.: US 10,834,065 B1
(45) Date of Patent: Nov. 10, 2020

(54) METHODS FOR SSL PROTECTED NTLM RE-AUTHENTICATION AND DEVICES THEREOF

(71) Applicant: F5 Networks, Inc., Seattle, WA (US)

(72) Inventors: Ravi Natarajan, Fremont, CA (US); Wui Chung Lie, San Jose, CA (US)

(73) Assignee: F5 Networks, Inc., Seattle, WA (US)

( * ) Notice: Subject to any disclaimer, the term of this patent is extended or adjusted under 35 U.S.C. 154(b) by 34 days.

(21) Appl. No.: 15/087,044

(22) Filed: Mar. 31, 2016

Related U.S. Application Data

(60) Provisional application No. 62/140,986, filed on Mar. 31, 2015.

(51) Int. Cl.
| | |
|---|---|
| *H04L 9/00* | (2006.01) |
| *H04L 29/06* | (2006.01) |
| *H04L 12/927* | (2013.01) |
| *H04L 29/08* | (2006.01) |

(52) U.S. Cl.
CPC ............ *H04L 63/08* (2013.01); *H04L 47/803* (2013.01); *H04L 63/10* (2013.01); *H04L 67/02* (2013.01); *H04L 67/42* (2013.01)

(58) Field of Classification Search
CPC ....................................................... G06F 17/30
See application file for complete search history.

(56) References Cited

U.S. PATENT DOCUMENTS

| | | | |
|---|---|---|---|
| 3,950,735 A | 4/1976 | Patel | |
| 4,438,511 A | 3/1984 | Baran | |
| 4,644,532 A | 2/1987 | George et al. | |
| 4,701,745 A | 10/1987 | Waterworth | |
| 4,736,369 A | 4/1988 | Barzilai et al. | |

(Continued)

FOREIGN PATENT DOCUMENTS

| | | |
|---|---|---|
| AU | 2003300350 A1 | 7/2004 |
| CA | 2080530 | 4/1994 |

(Continued)

OTHER PUBLICATIONS

F5 Networks, Inc., "BIG-IP® Access Policy Manager®: Implementations", F5 Networks, Inc., Jan. 7, 2014, Version 11.5, pp. 1-78.

(Continued)

*Primary Examiner* — Josnel Jeudy
(74) *Attorney, Agent, or Firm* — Troutman Pepper Hamilton Sanders LLP (Rochester)

(57) ABSTRACT

A method, non-transitory computer readable medium, and device that assists with SSL protected NTLM reauthentication includes receiving a connection reset message from a web application server. The received connection reset message is forwarded to the client computing device. A recent request including connection data to access a web application is received on a new connection as a response to the forwarded connection reset message from the client computing device. Next, it is determined whether the received recent request to access the web application including the connection data is identical to a stored connection data. The client computing device is re-authenticated and granted access to the requested web application to when the connection data is determined to be identical to the stored connection data.

22 Claims, 4 Drawing Sheets

(56) References Cited

U.S. PATENT DOCUMENTS

| | | |
|---|---|---|
| 4,750,171 A | 6/1988 | Kedar et al. |
| 4,893,307 A | 1/1990 | McKay et al. |
| 4,897,781 A | 1/1990 | Chang et al. |
| 4,922,486 A | 5/1990 | Lidinsky et al. |
| 4,928,247 A | 5/1990 | Doyle et al. |
| 4,941,089 A | 7/1990 | Fischer |
| 4,953,159 A | 8/1990 | Hayden et al. |
| 4,965,772 A | 10/1990 | Daniel et al. |
| 4,993,030 A | 2/1991 | Krakauer et al. |
| 5,014,221 A | 5/1991 | Mogul |
| 5,021,949 A | 6/1991 | Morten et al. |
| 5,023,826 A | 6/1991 | Patel |
| 5,029,164 A | 7/1991 | Goldstein et al. |
| 5,053,953 A | 10/1991 | Patel |
| 5,159,592 A | 10/1992 | Perkins |
| 5,167,024 A | 11/1992 | Smith et al. |
| 5,181,200 A | 1/1993 | Harrison |
| 5,218,695 A | 6/1993 | Noveck et al. |
| 5,241,625 A | 8/1993 | Epard et al. |
| 5,282,201 A | 1/1994 | Frank et al. |
| 5,299,312 A | 3/1994 | Rocco, Jr. |
| 5,303,368 A | 4/1994 | Kotaki |
| 5,307,456 A | 4/1994 | MacKay |
| 5,315,698 A | 5/1994 | Case et al. |
| 5,327,529 A | 7/1994 | Fults et al. |
| 5,345,588 A | 9/1994 | Greenwood et al. |
| 5,367,635 A | 11/1994 | Bauer et al. |
| 5,371,852 A | 12/1994 | Attanasio et al. |
| 5,392,223 A | 2/1995 | Caci |
| 5,406,502 A | 4/1995 | Haramaty |
| 5,410,543 A | 4/1995 | Seitz et al. |
| 5,442,637 A | 8/1995 | Nguyen |
| 5,446,736 A | 8/1995 | Gleeson et al. |
| 5,473,362 A | 12/1995 | Fitzgerald et al. |
| 5,475,856 A | 12/1995 | Dally |
| 5,475,857 A | 12/1995 | Daily |
| 5,511,177 A | 4/1996 | Kagimasa et al. |
| 5,517,617 A | 5/1996 | Sathaye et al. |
| 5,519,694 A | 5/1996 | Brewer et al. |
| 5,519,778 A | 5/1996 | Leighton et al. |
| 5,521,591 A | 5/1996 | Arora et al. |
| 5,528,701 A | 6/1996 | Aref |
| 5,537,585 A | 7/1996 | Blickenstaff et al. |
| 5,541,927 A | 7/1996 | Kristol et al. |
| 5,548,724 A | 8/1996 | Akizawa et al. |
| 5,550,816 A | 8/1996 | Hardwick et al. |
| 5,550,965 A | 8/1996 | Gabbe et al. |
| 5,564,070 A | 10/1996 | Want et al. |
| 5,566,225 A | 10/1996 | Haas |
| 5,572,674 A | 11/1996 | Ernst |
| 5,581,764 A | 12/1996 | Fitzgerald et al. |
| 5,583,995 A | 12/1996 | Gardner et al. |
| 5,586,260 A | 12/1996 | Hu |
| 5,590,320 A | 12/1996 | Maxey |
| 5,596,742 A | 1/1997 | Agarwal et al. |
| 5,606,665 A | 2/1997 | Yang et al. |
| 5,611,049 A | 3/1997 | Pitts |
| 5,623,490 A | 4/1997 | Richter et al. |
| 5,623,603 A | 4/1997 | Jiang et al. |
| 5,649,194 A | 7/1997 | Miller et al. |
| 5,649,200 A | 7/1997 | Leblang et al. |
| 5,655,081 A | 8/1997 | Bonnell et al. |
| 5,657,390 A | 8/1997 | Elgamal et al. |
| 5,663,018 A | 9/1997 | Cummings et al. |
| 5,668,943 A | 9/1997 | Attanasio et al. |
| 5,692,180 A | 11/1997 | Lee |
| 5,721,779 A | 2/1998 | Funk |
| 5,724,512 A | 3/1998 | Winterbottom |
| 5,734,825 A | 3/1998 | Lauck et al. |
| 5,737,416 A | 4/1998 | Cooper et al. |
| 5,752,023 A | 5/1998 | Chourci et al. |
| 5,757,795 A | 5/1998 | Schnell |
| 5,758,085 A | 5/1998 | Kouoheris et al. |
| 5,761,484 A | 6/1998 | Agarwal et al. |
| 5,765,915 A | 6/1998 | Lee |
| 5,768,257 A | 6/1998 | Khacherian et al. |
| 5,768,423 A | 6/1998 | Aref et al. |
| 5,774,660 A | 6/1998 | Brendel et al. |
| 5,790,554 A | 8/1998 | Pitcher et al. |
| 5,793,768 A | 8/1998 | Keshav |
| 5,802,052 A | 9/1998 | Venkataraman |
| 5,806,061 A | 9/1998 | Chaudhuri et al. |
| 5,809,235 A | 9/1998 | Sharma et al. |
| 5,812,550 A | 9/1998 | Sohn et al. |
| 5,822,543 A | 10/1998 | Dunn et al. |
| 5,825,772 A | 10/1998 | Dobbins et al. |
| 5,832,283 A | 11/1998 | Chou et al. |
| 5,832,496 A | 11/1998 | Anand et al. |
| 5,832,522 A | 11/1998 | Blickenstaff et al. |
| 5,838,682 A | 11/1998 | Dekelbaum et al. |
| 5,838,920 A | 11/1998 | Rosborough |
| 5,838,970 A | 11/1998 | Thomas |
| 5,862,325 A | 1/1999 | Reed et al. |
| 5,864,678 A | 1/1999 | Riddle |
| 5,868,190 A | 2/1999 | Willard, Jr. et al. |
| 5,875,296 A | 2/1999 | Shi et al. |
| 5,884,303 A | 3/1999 | Brown |
| 5,889,935 A | 3/1999 | Ofek et al. |
| 5,892,914 A | 4/1999 | Pitts |
| 5,892,932 A | 4/1999 | Kim |
| 5,893,086 A | 4/1999 | Schmuck et al. |
| 5,897,638 A | 4/1999 | Lasser et al. |
| 5,898,674 A | 4/1999 | Mawhinney et al. |
| 5,901,327 A | 5/1999 | Ofek |
| 5,903,355 A | 5/1999 | Schwarz |
| 5,905,990 A | 5/1999 | Inglett |
| 5,915,332 A | 6/1999 | Young et al. |
| 5,917,998 A | 6/1999 | Cabrera et al. |
| 5,919,247 A | 7/1999 | Van Hoff et al. |
| 5,920,701 A | 7/1999 | Miller et al. |
| 5,920,873 A | 7/1999 | Van Huben et al. |
| 5,926,816 A | 7/1999 | Bauer et al. |
| 5,933,412 A | 8/1999 | Choudhury et al. |
| 5,936,939 A | 8/1999 | Des Jardins et al. |
| 5,936,940 A | 8/1999 | Marin et al. |
| 5,937,169 A | 8/1999 | Connery et al. |
| 5,937,406 A | 8/1999 | Balabine et al. |
| 5,938,733 A | 8/1999 | Heimsoth et al. |
| 5,941,988 A | 8/1999 | Bhagwat et al. |
| 5,946,690 A | 8/1999 | Pitts |
| 5,949,885 A | 9/1999 | Leighton |
| 5,951,694 A | 9/1999 | Choquier et al. |
| 5,959,974 A | 9/1999 | Badt et al. |
| 5,959,990 A | 9/1999 | Frantz et al. |
| 5,968,176 A | 10/1999 | Nessett et al. |
| 5,974,028 A | 10/1999 | Ramakrishnan |
| 5,974,460 A | 10/1999 | Maddalozzo, Jr. et al. |
| 5,978,848 A | 11/1999 | Maddalozzo, Jr. et al. |
| 5,983,227 A | 11/1999 | Nazem et al. |
| 5,983,281 A | 11/1999 | Ogle et al. |
| 5,988,847 A | 11/1999 | McLaughlin et al. |
| 5,991,302 A | 11/1999 | Berl et al. |
| 5,995,491 A | 11/1999 | Richter et al. |
| 5,999,518 A | 12/1999 | Nattkemper et al. |
| 5,999,664 A | 12/1999 | Mahoney et al. |
| 6,003,030 A | 12/1999 | Kenner et al. |
| 6,005,843 A | 12/1999 | Kamiya |
| 6,006,260 A | 12/1999 | Barrick, Jr. et al. |
| 6,006,264 A | 12/1999 | Colby et al. |
| 6,012,083 A | 1/2000 | Savitzky et al. |
| 6,026,452 A | 2/2000 | Pitts |
| 6,026,500 A | 2/2000 | Topff et al. |
| 6,028,857 A | 2/2000 | Poor |
| 6,029,168 A | 2/2000 | Frey |
| 6,029,175 A | 2/2000 | Chow et al. |
| 6,041,365 A | 3/2000 | Kleinerman |
| 6,044,061 A | 3/2000 | Aybay et al. |
| 6,044,367 A | 3/2000 | Wolff |
| 6,044,444 A | 3/2000 | Ofek |
| 6,047,129 A | 4/2000 | Frye |
| 6,047,356 A | 4/2000 | Anderson et al. |
| 6,051,169 A | 4/2000 | Brown et al. |
| 6,058,480 A | 5/2000 | Brown |
| 6,061,796 A | 5/2000 | Chen et al. |

(56) References Cited

U.S. PATENT DOCUMENTS

| | | |
|---|---|---|
| 6,065,092 A | 5/2000 | Roy |
| 6,067,558 A | 5/2000 | Wendt et al. |
| 6,072,942 A | 6/2000 | Stockwell et al. |
| 6,076,113 A | 6/2000 | Ramanathan et al. |
| 6,078,582 A | 6/2000 | Curry et al. |
| 6,078,929 A | 6/2000 | Rao |
| 6,078,956 A | 6/2000 | Bryant et al. |
| 6,085,234 A | 7/2000 | Pitts et al. |
| 6,088,694 A | 7/2000 | Burns et al. |
| 6,092,196 A | 7/2000 | Reiche |
| 6,101,543 A | 8/2000 | Alden et al. |
| 6,104,706 A | 8/2000 | Richter et al. |
| 6,108,697 A | 8/2000 | Raymond et al. |
| 6,108,703 A | 8/2000 | Leighton et al. |
| 6,111,876 A | 8/2000 | Frantz et al. |
| 6,112,085 A | 8/2000 | Garner et al. |
| 6,128,279 A | 10/2000 | O'Neil et al. |
| 6,128,627 A | 10/2000 | Mattis et al. |
| 6,128,657 A | 10/2000 | Okanoya et al. |
| 6,128,717 A | 10/2000 | Harrison et al. |
| 6,131,110 A | 10/2000 | Bates et al. |
| 6,144,640 A | 11/2000 | Simpson et al. |
| 6,144,986 A | 11/2000 | Silver |
| 6,147,986 A | 11/2000 | Orsic |
| 6,154,777 A | 11/2000 | Ebrahim |
| 6,157,950 A | 12/2000 | Krishnan |
| 6,158,007 A | 12/2000 | Moreh et al. |
| 6,160,812 A | 12/2000 | Bauman et al. |
| 6,160,874 A | 12/2000 | Dickerman et al. |
| 6,161,145 A | 12/2000 | Bainbridge et al. |
| 6,161,185 A | 12/2000 | Guthrie et al. |
| 6,167,449 A | 12/2000 | Arnold et al. |
| 6,169,987 B1 | 1/2001 | Knoblock et al. |
| 6,170,022 B1 | 1/2001 | Linville et al. |
| 6,170,075 B1 | 1/2001 | Schuster et al. |
| 6,178,423 B1 | 1/2001 | Douceur et al. |
| 6,181,336 B1 | 1/2001 | Chiu et al. |
| 6,181,711 B1 | 1/2001 | Zhang et al. |
| 6,182,139 B1 | 1/2001 | Brendel |
| 6,192,051 B1 | 2/2001 | Lipman et al. |
| 6,198,920 B1 | 3/2001 | Doviak et al. |
| 6,202,156 B1 | 3/2001 | Kalajan |
| 6,215,774 B1 | 4/2001 | Knauerhase et al. |
| 6,223,206 B1 | 4/2001 | Dan et al. |
| 6,233,612 B1 | 5/2001 | Fruchtman et al. |
| 6,233,648 B1 | 5/2001 | Tomita |
| 6,235,188 B1 | 5/2001 | Nakamura et al. |
| 6,236,643 B1 | 5/2001 | Kerstein |
| 6,237,008 B1 | 5/2001 | Beal et al. |
| 6,246,684 B1 | 6/2001 | Chapman et al. |
| 6,252,851 B1 | 6/2001 | Siu et al. |
| 6,253,226 B1 | 6/2001 | Chidambaran et al. |
| 6,253,230 B1 | 6/2001 | Couland et al. |
| 6,253,326 B1 | 6/2001 | Lincke et al. |
| 6,256,031 B1 | 7/2001 | Meijer et al. |
| 6,256,673 B1 | 7/2001 | Gayman |
| 6,259,405 B1 | 7/2001 | Stewart et al. |
| 6,259,705 B1 | 7/2001 | Takahashi et al. |
| 6,260,070 B1 | 7/2001 | Shah |
| 6,263,368 B1 | 7/2001 | Martin |
| 6,282,172 B1 | 8/2001 | Robles et al. |
| 6,282,610 B1 | 8/2001 | Bergsten |
| 6,289,012 B1 | 9/2001 | Harrington et al. |
| 6,289,345 B1 | 9/2001 | Yasue |
| 6,289,382 B1 | 9/2001 | Bowman-Amuah |
| 6,292,172 B1 | 9/2001 | Makhlouf |
| 6,292,832 B1 | 9/2001 | Shah et al. |
| 6,298,380 B1 | 10/2001 | Coile et al. |
| 6,304,913 B1 | 10/2001 | Rune |
| 6,308,162 B1 | 10/2001 | Ouimet et al. |
| 6,308,213 B1 | 10/2001 | Valencia |
| 6,314,406 B1 | 11/2001 | O'Hagan et al. |
| 6,317,415 B1 | 11/2001 | Darnell et al. |
| 6,324,581 B1 | 11/2001 | Xu et al. |
| 6,324,582 B1 | 11/2001 | Sridhar et al. |
| 6,327,622 B1 | 12/2001 | Jindal et al. |
| 6,329,985 B1 | 12/2001 | Tamer et al. |
| 6,330,574 B1 | 12/2001 | Murashita |
| 6,332,163 B1 | 12/2001 | Bowman-Amuah |
| 6,333,931 B1 | 12/2001 | LaPier et al. |
| 6,338,082 B1 | 1/2002 | Schneider |
| 6,339,785 B1 | 1/2002 | Feigenbaum |
| 6,339,832 B1 | 1/2002 | Bowman-Amuah |
| 6,343,318 B1 | 1/2002 | Hawkins et al. |
| 6,343,324 B1 | 1/2002 | Hubis et al. |
| 6,347,339 B1 | 2/2002 | Morris et al. |
| 6,349,343 B1 | 2/2002 | Foody et al. |
| 6,353,848 B1 | 3/2002 | Morris |
| 6,359,882 B1 | 3/2002 | Robles et al. |
| 6,360,270 B1 | 3/2002 | Cherkasova et al. |
| 6,363,056 B1 | 3/2002 | Beigi et al. |
| 6,363,429 B1 | 3/2002 | Ketcham |
| 6,370,527 B1 | 4/2002 | Singhal |
| 6,370,543 B2 | 4/2002 | Hoffert et al. |
| 6,374,263 B1 | 4/2002 | Bunger et al. |
| 6,374,300 B2 | 4/2002 | Masters |
| 6,374,336 B1 | 4/2002 | Peters et al. |
| 6,381,215 B1 | 4/2002 | Hamilton et al. |
| 6,389,433 B1 | 5/2002 | Bolosky et al. |
| 6,389,462 B1 | 5/2002 | Cohen et al. |
| 6,393,581 B1 | 5/2002 | Friedman et al. |
| 6,396,833 B1 | 5/2002 | Zhang et al. |
| 6,397,246 B1 | 5/2002 | Wolfe |
| 6,397,259 B1 | 5/2002 | Lincke et al. |
| 6,400,996 B1 | 6/2002 | Hoffberg et al. |
| 6,405,252 B1 | 6/2002 | Gupta et al. |
| 6,411,986 B1 | 6/2002 | Susai et al. |
| 6,412,004 B1 | 6/2002 | Chen et al. |
| 6,421,726 B1 | 7/2002 | Kenner et al. |
| 6,424,659 B2 | 7/2002 | Viswanadham et al. |
| 6,430,562 B1 | 8/2002 | Kardos et al. |
| 6,434,081 B1 | 8/2002 | Johnson et al. |
| 6,434,568 B1 | 8/2002 | Bowman-Amuah |
| 6,434,628 B1 | 8/2002 | Bowman-Amuah |
| 6,438,102 B1 | 8/2002 | Chui et al. |
| 6,438,594 B1 | 8/2002 | Bowman-Amuah |
| 6,438,595 B1 | 8/2002 | Blumenau et al. |
| 6,442,748 B1 | 8/2002 | Bowman-Amuah |
| 6,446,108 B1 | 9/2002 | Rosenberg et al. |
| 6,449,283 B1 | 9/2002 | Chao et al. |
| 6,452,915 B1 | 9/2002 | Jorgensen |
| 6,457,052 B1 | 9/2002 | Markowitz et al. |
| 6,463,470 B1 | 10/2002 | Mohaban et al. |
| 6,466,580 B1 | 10/2002 | Leung |
| 6,466,984 B1 | 10/2002 | Naveh et al. |
| 6,469,983 B2 | 10/2002 | Narayana et al. |
| 6,470,021 B1 | 10/2002 | Daines et al. |
| 6,473,794 B1 | 10/2002 | Guheen et al. |
| 6,473,802 B2 | 10/2002 | Masters |
| 6,477,544 B1 | 11/2002 | Bolosky et al. |
| 6,477,665 B1 | 11/2002 | Bowman-Amuah |
| 6,480,476 B1 | 11/2002 | Willars |
| 6,484,261 B1 | 11/2002 | Wiegel |
| 6,487,561 B1 | 11/2002 | Ofek et al. |
| 6,487,598 B1 | 11/2002 | Valencia |
| 6,490,624 B1 | 12/2002 | Sampson et al. |
| 6,493,804 B1 | 12/2002 | Soltis et al. |
| 6,496,481 B1 | 12/2002 | Wu et al. |
| 6,496,520 B1 | 12/2002 | Acosta |
| 6,496,850 B1 | 12/2002 | Bowman-Amuah |
| 6,496,856 B1 | 12/2002 | Kenner et al. |
| 6,499,107 B1 | 12/2002 | Gleichauf et al. |
| 6,502,102 B1 | 12/2002 | Haswell et al. |
| 6,502,125 B1 | 12/2002 | Kenner et al. |
| 6,502,135 B1 | 12/2002 | Munger et al. |
| 6,502,213 B1 | 12/2002 | Bowman-Amuah |
| 6,510,135 B1 | 1/2003 | Almulhem et al. |
| 6,510,458 B1 | 1/2003 | Berstis et al. |
| 6,513,061 B1 | 1/2003 | Ebata et al. |
| 6,514,085 B2 | 2/2003 | Slattery et al. |
| 6,516,315 B1 | 2/2003 | Gupta |
| 6,516,350 B1 | 2/2003 | Lumelsky et al. |
| 6,516,351 B2 | 2/2003 | Borr |
| 6,519,571 B1 | 2/2003 | Guheen et al. |

(56) References Cited

U.S. PATENT DOCUMENTS

| | | |
|---|---|---|
| 6,519,643 B1 | 2/2003 | Foulkes et al. |
| 6,529,909 B1 | 3/2003 | Bowman-Amuah |
| 6,529,948 B1 | 3/2003 | Bowman-Amuah |
| 6,536,037 B1 | 3/2003 | Guheen et al. |
| 6,539,396 B1 | 3/2003 | Bowman-Amuah |
| 6,539,429 B2 | 3/2003 | Rakavy et al. |
| 6,542,909 B1 | 4/2003 | Tamer et al. |
| 6,542,936 B1 | 4/2003 | Mayle et al. |
| 6,546,425 B1 | 4/2003 | Hanson et al. |
| 6,549,916 B1 | 4/2003 | Sedlar |
| 6,549,949 B1 | 4/2003 | Bowman-Amuah |
| 6,550,057 B1 | 4/2003 | Bowman-Amuah |
| 6,553,352 B2 | 4/2003 | Delurgio et al. |
| 6,556,997 B1 | 4/2003 | Levy |
| 6,556,998 B1 | 4/2003 | Mukherjee et al. |
| 6,560,230 B1 | 5/2003 | Li et al. |
| 6,560,243 B1 | 5/2003 | Mogul |
| 6,571,282 B1 | 5/2003 | Bowman-Amuah |
| 6,573,907 B1 | 6/2003 | Madrane |
| 6,578,068 B1 | 6/2003 | Bowman-Amuah |
| 6,578,069 B1 | 6/2003 | Hopmann et al. |
| 6,578,076 B1 | 6/2003 | Putzolu |
| 6,584,569 B2 | 6/2003 | Reshef et al. |
| 6,587,437 B1 | 7/2003 | Lee et al. |
| 6,590,588 B2 | 7/2003 | Lincke et al. |
| 6,595,417 B2 | 7/2003 | O'Hagan et al. |
| 6,601,084 B1 | 7/2003 | Bhaskaran et al. |
| 6,601,101 B1 | 7/2003 | Lee et al. |
| 6,601,192 B1 | 7/2003 | Bowman-Amuah |
| 6,601,233 B1 | 7/2003 | Underwood |
| 6,601,234 B1 | 7/2003 | Bowman-Amuah |
| 6,603,771 B1 | 8/2003 | Raza |
| 6,606,660 B1 | 8/2003 | Bowman-Amuah |
| 6,606,663 B1 | 8/2003 | Liao et al. |
| 6,606,744 B1 | 8/2003 | Mikurak |
| 6,609,128 B1 | 8/2003 | Underwood |
| 6,611,522 B1 | 8/2003 | Zheng et al. |
| 6,612,490 B1 | 9/2003 | Herrendoerfer et al. |
| 6,615,166 B1 | 9/2003 | Guheen et al. |
| 6,615,199 B1 | 9/2003 | Bowman-Amuah |
| 6,615,253 B1 | 9/2003 | Bowman-Amuah |
| 6,615,267 B1 | 9/2003 | Whalen et al. |
| 6,618,379 B1 | 9/2003 | Ramamurthy et al. |
| 6,618,761 B2 | 9/2003 | Munger et al. |
| 6,622,172 B1 | 9/2003 | Tam |
| 6,624,766 B1 | 9/2003 | Possley et al. |
| 6,625,177 B1 | 9/2003 | Raza |
| 6,631,422 B1 | 10/2003 | Althaus et al. |
| 6,633,878 B1 | 10/2003 | Underwood |
| 6,633,886 B1 | 10/2003 | Chong et al. |
| 6,636,242 B2 | 10/2003 | Bowman-Amuah |
| 6,636,503 B1 | 10/2003 | Shiran et al. |
| 6,636,894 B1 | 10/2003 | Short et al. |
| 6,640,238 B1 | 10/2003 | Bowman-Amuah |
| 6,640,248 B1 | 10/2003 | Jorgensen |
| 6,640,249 B1 | 10/2003 | Bowman-Amuah |
| 6,650,640 B1 | 11/2003 | Muller et al. |
| 6,650,641 B1 | 11/2003 | Albert et al. |
| 6,654,346 B1 | 11/2003 | Mahalingaiah et al. |
| 6,654,701 B2 | 11/2003 | Hatley et al. |
| 6,657,954 B1 | 12/2003 | Bird et al. |
| 6,658,021 B1 | 12/2003 | Bromley et al. |
| 6,658,624 B1 | 12/2003 | Savitzky et al. |
| 6,661,802 B1 | 12/2003 | Homberg et al. |
| 6,665,706 B2 | 12/2003 | Kenner et al. |
| 6,667,984 B1 | 12/2003 | Chao et al. |
| 6,671,818 B1 | 12/2003 | Mikurak |
| 6,680,976 B1 | 1/2004 | Chen et al. |
| 6,683,873 B1 | 1/2004 | Kwok et al. |
| 6,687,227 B1 | 2/2004 | Li et al. |
| 6,687,732 B1 | 2/2004 | Bector et al. |
| 6,687,745 B1 | 2/2004 | Franco et al. |
| 6,691,165 B1 | 2/2004 | Bruck et al. |
| 6,691,232 B1 | 2/2004 | Wood et al. |
| 6,694,517 B1 | 2/2004 | James et al. |
| 6,697,368 B2 | 2/2004 | Chang et al. |
| 6,697,871 B1 | 2/2004 | Hansen |
| 6,697,984 B1 | 2/2004 | Sim et al. |
| 6,701,415 B1 | 3/2004 | Hendren, III |
| 6,701,514 B1 | 3/2004 | Haswell et al. |
| 6,704,755 B2 | 3/2004 | Midgley et al. |
| 6,704,873 B1 | 3/2004 | Underwood |
| 6,708,187 B1 | 3/2004 | Shanumgam et al. |
| 6,708,220 B1 | 3/2004 | Olin |
| 6,711,164 B1 | 3/2004 | Le et al. |
| 6,711,166 B1 | 3/2004 | Amir et al. |
| 6,714,536 B1 | 3/2004 | Dowling |
| 6,715,145 B1 | 3/2004 | Bowman-Amuah |
| 6,718,380 B1 | 4/2004 | Mohaban et al. |
| 6,718,535 B1 | 4/2004 | Underwood |
| 6,721,713 B1 | 4/2004 | Guheen et al. |
| 6,721,794 B2 | 4/2004 | Taylor et al. |
| 6,728,265 B1 | 4/2004 | Yavatkar et al. |
| 6,728,704 B2 | 4/2004 | Mao et al. |
| 6,735,218 B2 | 5/2004 | Chang et al. |
| 6,738,357 B1 | 5/2004 | Richter et al. |
| 6,738,790 B1 | 5/2004 | Klein et al. |
| 6,742,015 B1 | 5/2004 | Bowman-Amuah |
| 6,742,035 B1 | 5/2004 | Zayas et al. |
| 6,742,045 B1 | 5/2004 | Albert et al. |
| 6,744,776 B1 | 6/2004 | Kalkunte et al. |
| 6,745,360 B1 | 6/2004 | Srinivas et al. |
| 6,748,420 B1 | 6/2004 | Quatrano et al. |
| 6,751,453 B2 | 6/2004 | Schemers et al. |
| 6,751,663 B1 | 6/2004 | Farrell et al. |
| 6,751,673 B2 | 6/2004 | Shaw |
| 6,754,215 B1 | 6/2004 | Arikawa et al. |
| 6,754,228 B1 | 6/2004 | Ludwig |
| 6,754,699 B2 | 6/2004 | Swildens et al. |
| 6,757,706 B1 | 6/2004 | Dong et al. |
| 6,760,337 B1 | 7/2004 | Snyder, II et al. |
| 6,760,775 B1 | 7/2004 | Anerousis et al. |
| 6,772,219 B1 | 8/2004 | Shobatake |
| 6,775,672 B2 | 8/2004 | Mahalingam et al. |
| 6,775,673 B2 | 8/2004 | Mahalingam et al. |
| 6,775,679 B2 | 8/2004 | Gupta |
| 6,778,092 B2 | 8/2004 | Braune |
| 6,779,039 B1 | 8/2004 | Bommareddy et al. |
| 6,781,986 B1 | 8/2004 | Sabaa et al. |
| 6,782,450 B2 | 8/2004 | Arnott et al. |
| 6,785,236 B1 | 8/2004 | Lo et al. |
| 6,788,682 B1 | 9/2004 | Kimmitt |
| 6,789,154 B1 | 9/2004 | Lee et al. |
| 6,792,615 B1 | 9/2004 | Rowe et al. |
| 6,795,860 B1 | 9/2004 | Shah |
| 6,798,777 B1 | 9/2004 | Ferguson et al. |
| 6,799,221 B1 | 9/2004 | Kenner et al. |
| 6,801,499 B1 | 10/2004 | Anandakumar et al. |
| 6,801,960 B1 | 10/2004 | Ericson et al. |
| 6,804,542 B1 | 10/2004 | Haartsen |
| 6,807,648 B1 | 10/2004 | Cansever et al. |
| 6,816,901 B1 | 11/2004 | Sitaraman et al. |
| 6,816,963 B1 | 11/2004 | Krithivas et al. |
| 6,816,977 B2 | 11/2004 | Brakmo et al. |
| 6,820,133 B1 | 11/2004 | Grove et al. |
| 6,826,613 B1 | 11/2004 | Wang et al. |
| 6,826,616 B2 | 11/2004 | Larson et al. |
| 6,826,698 B1 | 11/2004 | Minkin et al. |
| 6,829,238 B2 | 12/2004 | Tokuyo et al. |
| 6,834,297 B1 | 12/2004 | Peiffer et al. |
| 6,834,310 B2 | 12/2004 | Munger et al. |
| 6,839,759 B2 | 1/2005 | Larson et al. |
| 6,839,761 B2 | 1/2005 | Kadyk et al. |
| 6,842,906 B1 | 1/2005 | Bowman-Amuah |
| 6,847,892 B2 | 1/2005 | Zhou et al. |
| 6,847,959 B1 | 1/2005 | Arrouye et al. |
| 6,847,970 B1 | 1/2005 | Keller et al. |
| 6,850,252 B1 | 2/2005 | Hoffberg |
| 6,850,491 B1 | 2/2005 | Firoiu et al. |
| 6,850,997 B1 | 2/2005 | Rooney et al. |
| 6,856,651 B2 | 2/2005 | Singh |
| 6,857,009 B1 | 2/2005 | Ferreria |
| 6,859,776 B1 | 2/2005 | Cohen et al. |
| 6,862,282 B1 | 3/2005 | Oden |

(56) References Cited

U.S. PATENT DOCUMENTS

| | | |
|---|---|---|
| 6,865,593 B1 | 3/2005 | Reshef et al. |
| 6,868,082 B1 | 3/2005 | Allen, Jr. et al. |
| 6,868,439 B2 | 3/2005 | Basu et al. |
| 6,868,447 B1 | 3/2005 | Slaughter et al. |
| 6,871,221 B1 | 3/2005 | Styles |
| 6,871,245 B2 | 3/2005 | Bradley |
| 6,876,629 B2 | 4/2005 | Beshai et al. |
| 6,876,654 B1 | 4/2005 | Hegde |
| 6,877,043 B2 | 4/2005 | Mallory et al. |
| 6,880,017 B1 | 4/2005 | Marce et al. |
| 6,880,086 B2 | 4/2005 | Kidder et al. |
| 6,882,624 B1 | 4/2005 | Ma |
| 6,882,634 B2 | 4/2005 | Bagchi et al. |
| 6,883,137 B1 | 4/2005 | Girardot et al. |
| 6,888,836 B1 | 5/2005 | Cherkasova |
| 6,888,844 B2 | 5/2005 | Mallory et al. |
| 6,888,927 B1 | 5/2005 | Cruickshank et al. |
| 6,889,249 B2 | 5/2005 | Miloushev et al. |
| 6,891,799 B1 | 5/2005 | Hagai et al. |
| 6,891,830 B2 | 5/2005 | Curtis |
| 6,891,881 B2 | 5/2005 | Trachewsky et al. |
| 6,898,204 B2 | 5/2005 | Trachewsky et al. |
| 6,901,072 B1 | 5/2005 | Wong |
| 6,901,075 B1 | 5/2005 | Baron |
| 6,904,040 B2 | 6/2005 | Salapura et al. |
| 6,907,473 B2 | 6/2005 | Schmidt et al. |
| 6,907,546 B1 | 6/2005 | Haswell et al. |
| 6,914,881 B1 | 7/2005 | Mansfield et al. |
| 6,914,886 B2 | 7/2005 | Peles et al. |
| 6,915,477 B2 | 7/2005 | Gollamudi et al. |
| 6,920,148 B1 | 7/2005 | Johnson et al. |
| 6,922,688 B1 | 7/2005 | Frey, Jr. |
| 6,928,082 B2 | 8/2005 | Liu et al. |
| 6,928,473 B1 | 8/2005 | Sundaram et al. |
| 6,928,518 B2 | 8/2005 | Talagala |
| 6,934,288 B2 | 8/2005 | Dempo |
| 6,934,706 B1 | 8/2005 | Mancuso et al. |
| 6,938,039 B1 | 8/2005 | Bober et al. |
| 6,938,059 B2 | 8/2005 | Tamer et al. |
| 6,947,985 B2 | 9/2005 | Hegli et al. |
| 6,950,434 B1 | 9/2005 | Viswanath et al. |
| 6,954,780 B2 | 10/2005 | Susai et al. |
| 6,954,800 B2 | 10/2005 | Mallory |
| 6,954,801 B1 | 10/2005 | Housel |
| 6,957,186 B1 | 10/2005 | Guheen et al. |
| 6,957,272 B2 | 10/2005 | Tallegas et al. |
| 6,959,002 B2 | 10/2005 | Wynne et al. |
| 6,959,373 B2 | 10/2005 | Testardi |
| 6,959,394 B1 | 10/2005 | Brickell et al. |
| 6,961,815 B2 | 11/2005 | Kistler et al. |
| 6,970,475 B1 | 11/2005 | Fraser et al. |
| 6,970,552 B1 | 11/2005 | Hahn et al. |
| 6,970,924 B1 | 11/2005 | Chu et al. |
| 6,973,097 B1 | 12/2005 | Donzis et al. |
| 6,973,455 B1 | 12/2005 | Vahalia et al. |
| 6,973,490 B1 | 12/2005 | Robertson et al. |
| 6,973,549 B1 | 12/2005 | Testardi |
| 6,975,592 B1 | 12/2005 | Seddigh et al. |
| 6,975,655 B2 | 12/2005 | Fischer et al. |
| 6,980,543 B1 | 12/2005 | Kastenholz et al. |
| 6,981,047 B2 | 12/2005 | Hanson et al. |
| 6,981,087 B1 | 12/2005 | Heitkamp et al. |
| 6,981,143 B2 | 12/2005 | Mullen et al. |
| 6,981,180 B1 | 12/2005 | Bailey et al. |
| 6,982,963 B2 | 1/2006 | Asahina |
| 6,985,936 B2 | 1/2006 | Agarwalla et al. |
| 6,985,956 B2 | 1/2006 | Luke et al. |
| 6,986,015 B2 | 1/2006 | Testardi |
| 6,986,040 B1 | 1/2006 | Kramer et al. |
| 6,987,763 B2 | 1/2006 | Rochberger et al. |
| 6,988,236 B2 | 1/2006 | Ptasinski et al. |
| 6,990,070 B1 | 1/2006 | Aweya et al. |
| 6,990,074 B2 | 1/2006 | Wan et al. |
| 6,990,114 B1 | 1/2006 | Erimli et al. |
| 6,990,547 B2 | 1/2006 | Ulrich et al. |
| 6,990,667 B2 | 1/2006 | Ulrich et al. |
| 6,993,101 B2 | 1/2006 | Trachewsky et al. |
| 6,996,841 B2 | 2/2006 | Kadyk et al. |
| 6,999,419 B2 | 2/2006 | Ise et al. |
| 6,999,912 B2 | 2/2006 | Loisey et al. |
| 7,000,031 B2 | 2/2006 | Fischer et al. |
| 7,003,533 B2 | 2/2006 | Noguchi et al. |
| 7,003,564 B2 | 2/2006 | Greuel et al. |
| 7,003,777 B2 | 2/2006 | Hines |
| 7,006,502 B2 | 2/2006 | Lin |
| 7,006,981 B2 | 2/2006 | Rose et al. |
| 7,007,089 B2 | 2/2006 | Freedman |
| 7,007,092 B2 | 2/2006 | Peiffer |
| 7,010,553 B2 | 3/2006 | Chen et al. |
| 7,010,615 B1 | 3/2006 | Tezuka et al. |
| 7,013,379 B1 | 3/2006 | Testardi |
| 7,016,367 B1 | 3/2006 | Dyckerhoff et al. |
| 7,016,973 B1 | 3/2006 | Sibal et al. |
| 7,020,644 B2 | 3/2006 | Jameson |
| 7,020,669 B2 | 3/2006 | McCann et al. |
| 7,020,713 B1 | 3/2006 | Shah et al. |
| 7,020,714 B2 | 3/2006 | Kalyanaraman et al. |
| 7,020,719 B1 | 3/2006 | Grove et al. |
| 7,023,807 B2 | 4/2006 | Michels et al. |
| 7,023,974 B1 | 4/2006 | Brannam et al. |
| 7,023,979 B1 | 4/2006 | Wu et al. |
| 7,024,427 B2 | 4/2006 | Bobbitt et al. |
| 7,025,209 B2 | 4/2006 | Hawkins |
| 7,027,975 B1 | 4/2006 | Pazandak et al. |
| 7,028,083 B2 | 4/2006 | Levine et al. |
| 7,031,315 B2 | 4/2006 | Tanaka |
| 7,032,153 B1 | 4/2006 | Zhang et al. |
| 7,035,212 B1 | 4/2006 | Mittal et al. |
| 7,035,285 B2 | 4/2006 | Holloway et al. |
| 7,035,914 B1 | 4/2006 | Payne et al. |
| 7,039,061 B2 | 5/2006 | Connor et al. |
| 7,039,828 B1 | 5/2006 | Scott |
| 7,043,225 B1 | 5/2006 | Patel et al. |
| 7,050,396 B1 | 5/2006 | Cohen et al. |
| 7,051,112 B2 | 5/2006 | Dawson |
| 7,054,998 B2 | 5/2006 | Arnott et al. |
| 7,055,010 B2 | 5/2006 | Lin et al. |
| 7,055,028 B2 | 5/2006 | Peiffer et al. |
| 7,058,633 B1 | 6/2006 | Gnagy et al. |
| 7,062,645 B2 | 6/2006 | Kroening |
| 7,065,482 B2 | 6/2006 | Shorey et al. |
| 7,068,641 B1 | 6/2006 | Allan et al. |
| 7,072,917 B2 | 7/2006 | Wong et al. |
| 7,075,924 B2 | 7/2006 | Richter et al. |
| 7,076,689 B2 | 7/2006 | Atkinson |
| 7,080,314 B1 | 7/2006 | Garofalakis et al. |
| 7,089,286 B1 | 8/2006 | Malik |
| 7,089,491 B2 | 8/2006 | Feinberg et al. |
| 7,092,502 B2 | 8/2006 | Mohn et al. |
| 7,100,195 B1 | 8/2006 | Underwood |
| 7,103,068 B1 | 9/2006 | Gardner et al. |
| 7,111,115 B2 | 9/2006 | Peters et al. |
| 7,113,962 B1 | 9/2006 | Kee et al. |
| 7,113,993 B1 | 9/2006 | Cappiello et al. |
| 7,113,996 B2 | 9/2006 | Kronenberg |
| 7,116,894 B1 | 10/2006 | Chatterton |
| 7,120,728 B2 | 10/2006 | Krakirian et al. |
| 7,120,746 B2 | 10/2006 | Campbell et al. |
| 7,123,613 B1 | 10/2006 | Chawla et al. |
| 7,124,101 B1 | 10/2006 | Mikurak |
| 7,126,913 B1 | 10/2006 | Patel et al. |
| 7,127,556 B2 | 10/2006 | Blumenau et al. |
| 7,130,807 B1 | 10/2006 | Mikurak |
| 7,133,863 B2 | 11/2006 | Teng et al. |
| 7,133,944 B2 | 11/2006 | Song et al. |
| 7,133,967 B2 | 11/2006 | Fujie et al. |
| 7,136,645 B2 | 11/2006 | Hanson et al. |
| 7,139,792 B1 | 11/2006 | Mishra et al. |
| 7,143,146 B2 | 11/2006 | Nakatani et al. |
| 7,143,153 B1 | 11/2006 | Black et al. |
| 7,146,524 B2 | 12/2006 | Patel et al. |
| 7,149,698 B2 | 12/2006 | Guheen et al. |
| 7,150,017 B1 | 12/2006 | Vogl et al. |
| 7,152,184 B2 | 12/2006 | Maeda et al. |

(56) References Cited

U.S. PATENT DOCUMENTS

| | | |
|---|---|---|
| 7,155,466 B2 | 12/2006 | Rodriguez et al. |
| 7,161,904 B2 | 1/2007 | Hussain et al. |
| 7,165,041 B1 | 1/2007 | Guheen et al. |
| 7,165,095 B2 | 1/2007 | Sim |
| 7,167,821 B2 | 1/2007 | Hardwick et al. |
| 7,171,469 B2 | 1/2007 | Ackaouy et al. |
| 7,173,929 B1 | 2/2007 | Testardi |
| 7,174,126 B2 | 2/2007 | McElhatten et al. |
| 7,174,493 B2 | 2/2007 | Matsumoto et al. |
| 7,181,523 B2 | 2/2007 | Sim |
| 7,185,359 B2 | 2/2007 | Schmidt et al. |
| 7,188,180 B2 | 3/2007 | Larson et al. |
| 7,191,163 B2 | 3/2007 | Herrera et al. |
| 7,194,579 B2 | 3/2007 | Robinson et al. |
| 7,197,234 B1 | 3/2007 | Chatterton |
| 7,197,615 B2 | 3/2007 | Arakawa et al. |
| 7,197,751 B2 | 3/2007 | Fedotov et al. |
| 7,200,153 B2 | 4/2007 | Feuerstraeter et al. |
| 7,206,805 B1 | 4/2007 | McLaughlin, Jr. |
| 7,206,811 B2 | 4/2007 | Skurikhin et al. |
| 7,209,437 B1 | 4/2007 | Hodgkinson et al. |
| 7,219,127 B2 | 5/2007 | Huck et al. |
| 7,219,260 B1 | 5/2007 | de Forest et al. |
| 7,222,305 B2 | 5/2007 | Teplov et al. |
| 7,225,244 B2 | 5/2007 | Reynolds et al. |
| 7,227,872 B1 | 6/2007 | Biswas et al. |
| 7,228,359 B1 | 6/2007 | Monteiro |
| 7,228,422 B2 | 6/2007 | Morioka et al. |
| 7,231,571 B2 | 6/2007 | Buckely, Jr. |
| 7,234,074 B2 | 6/2007 | Cohn et al. |
| 7,236,491 B2 | 6/2007 | Tsao et al. |
| 7,237,076 B2 | 6/2007 | Nakano et al. |
| 7,240,100 B1 | 7/2007 | Wein et al. |
| 7,243,089 B2 | 7/2007 | Becker-Szendy et al. |
| 7,243,094 B2 | 7/2007 | Tabellion et al. |
| 7,257,633 B2 | 8/2007 | Masputra et al. |
| 7,260,840 B2 | 8/2007 | Swander et al. |
| 7,263,610 B2 | 8/2007 | Parker et al. |
| 7,266,773 B2 | 9/2007 | Dorwart |
| 7,269,168 B2 | 9/2007 | Roy et al. |
| 7,269,582 B2 | 9/2007 | Winter et al. |
| 7,272,613 B2 | 9/2007 | Sim et al. |
| 7,280,536 B2 | 10/2007 | Testardi |
| 7,280,547 B2 | 10/2007 | Featherston et al. |
| 7,283,470 B1 | 10/2007 | Sindhu et al. |
| 7,284,150 B2 | 10/2007 | Ma et al. |
| 7,286,566 B1 | 10/2007 | Parruck et al. |
| 7,287,082 B1 | 10/2007 | O'Toole, Jr. |
| 7,292,541 B1 | 11/2007 | Cs |
| 7,293,097 B2 | 11/2007 | Borr |
| 7,293,099 B1 | 11/2007 | Kalajan |
| 7,293,133 B1 | 11/2007 | Colgrove et al. |
| 7,295,827 B2 | 11/2007 | Liu et al. |
| 7,296,263 B1 | 11/2007 | Jacob |
| 7,299,250 B2 | 11/2007 | Douceur et al. |
| 7,308,475 B1 | 12/2007 | Pruitt et al. |
| 7,308,703 B2 | 12/2007 | Wright et al. |
| 7,308,709 B1 | 12/2007 | Brezak et al. |
| 7,310,336 B2 | 12/2007 | Malkamaki |
| 7,310,339 B1 | 12/2007 | Powers et al. |
| 7,318,100 B2 | 1/2008 | Demmer et al. |
| 7,319,696 B2 | 1/2008 | Inoue et al. |
| 7,321,926 B1 | 1/2008 | Zhang et al. |
| 7,321,936 B2 | 1/2008 | Zimmerman et al. |
| 7,324,533 B1 | 1/2008 | DeLiberato et al. |
| 7,330,486 B2 | 2/2008 | Ko et al. |
| 7,333,999 B1 | 2/2008 | Njemanze |
| 7,340,571 B2 | 3/2008 | Saze |
| 7,340,572 B2 | 3/2008 | Cochran |
| 7,343,398 B1 * | 3/2008 | Lownsbrough ......... H04L 63/08 709/218 |
| 7,343,413 B2 | 3/2008 | Gilde et al. |
| 7,346,664 B2 | 3/2008 | Wong et al. |
| 7,349,391 B2 | 3/2008 | Ben-Dor et al. |
| 7,352,702 B2 | 4/2008 | Rosier |
| 7,360,237 B2 | 4/2008 | Engle et al. |
| 7,373,345 B2 | 5/2008 | Carpentier et al. |
| 7,373,438 B1 | 5/2008 | DeBergalis et al. |
| 7,373,520 B1 | 5/2008 | Borthakur et al. |
| 7,383,288 B2 | 6/2008 | Miloushev et al. |
| 7,383,463 B2 | 6/2008 | Hayden et al. |
| 7,383,570 B2 | 6/2008 | Pinkas et al. |
| 7,398,552 B2 | 7/2008 | Pardee et al. |
| 7,401,220 B2 | 7/2008 | Bolosky et al. |
| 7,406,484 B1 | 7/2008 | Srinivasan et al. |
| 7,409,440 B1 | 8/2008 | Jacob |
| 7,415,488 B1 | 8/2008 | Muth et al. |
| 7,415,608 B2 | 8/2008 | Bolosky et al. |
| 7,418,439 B2 | 8/2008 | Wong |
| 7,433,962 B2 | 10/2008 | Janssen et al. |
| 7,437,358 B2 | 10/2008 | Arrouye et al. |
| 7,440,982 B2 | 10/2008 | Lu et al. |
| 7,454,480 B2 | 11/2008 | Labio et al. |
| 7,457,982 B2 | 11/2008 | Rajan |
| 7,467,158 B2 | 12/2008 | Marinescu |
| 7,475,241 B2 | 1/2009 | Patel et al. |
| 7,477,796 B2 | 1/2009 | Sasaki et al. |
| 7,490,162 B1 | 2/2009 | Masters |
| 7,499,542 B2 | 3/2009 | Vaudenay et al. |
| 7,500,243 B2 | 3/2009 | Huetsch et al. |
| 7,500,269 B2 | 3/2009 | Huotari et al. |
| 7,502,860 B1 | 3/2009 | Champagne |
| 7,505,795 B1 | 3/2009 | Lim et al. |
| 7,509,322 B2 | 3/2009 | Miloushev et al. |
| 7,512,673 B2 | 3/2009 | Miloushev et al. |
| 7,516,492 B1 | 4/2009 | Nisbet et al. |
| 7,519,813 B1 | 4/2009 | Cox et al. |
| 7,522,581 B2 | 4/2009 | Acharya et al. |
| 7,526,541 B2 | 4/2009 | Roese et al. |
| 7,536,472 B2 | 5/2009 | O'Neal |
| 7,536,473 B2 | 5/2009 | Ajanovic et al. |
| 7,539,130 B2 | 5/2009 | Le et al. |
| 7,542,472 B1 | 6/2009 | Gerendai et al. |
| 7,552,126 B2 | 6/2009 | Chen et al. |
| 7,555,608 B2 | 6/2009 | Naik et al. |
| 7,558,197 B1 | 7/2009 | Sindhu et al. |
| 7,562,110 B2 | 7/2009 | Miloushev et al. |
| 7,571,168 B2 | 8/2009 | Bahar et al. |
| 7,574,433 B2 | 8/2009 | Engel |
| 7,577,723 B2 | 8/2009 | Matsuda et al. |
| 7,580,971 B1 | 8/2009 | Gollapudi et al. |
| 7,587,471 B2 | 9/2009 | Yasuda et al. |
| 7,590,732 B2 | 9/2009 | Rune |
| 7,590,747 B2 | 9/2009 | Coates et al. |
| 7,599,941 B2 | 10/2009 | Bahar et al. |
| 7,609,640 B2 | 10/2009 | Ahuja et al. |
| 7,610,307 B2 | 10/2009 | Havewala et al. |
| 7,610,390 B2 | 10/2009 | Yared et al. |
| 7,616,638 B2 | 11/2009 | Samuels et al. |
| 7,624,109 B2 | 11/2009 | Testardi |
| 7,624,424 B2 | 11/2009 | Morita et al. |
| 7,639,883 B2 | 12/2009 | Gill |
| 7,640,347 B1 | 12/2009 | Sloat et al. |
| 7,644,109 B2 | 1/2010 | Manley et al. |
| 7,644,137 B2 | 1/2010 | Bozak et al. |
| 7,653,699 B1 | 1/2010 | Colgrove et al. |
| 7,656,788 B2 | 2/2010 | Ma et al. |
| 7,656,799 B2 | 2/2010 | Samuels et al. |
| 7,664,026 B2 | 2/2010 | Huang et al. |
| 7,668,166 B1 | 2/2010 | Rekhter et al. |
| 7,673,074 B1 | 3/2010 | Sebastian et al. |
| 7,680,836 B2 | 3/2010 | Anderson et al. |
| 7,680,915 B2 | 3/2010 | Still et al. |
| 7,684,423 B2 | 3/2010 | Tripathi et al. |
| 7,685,126 B2 | 3/2010 | Patel et al. |
| 7,685,177 B1 | 3/2010 | Hagerstrom et al. |
| 7,689,596 B2 | 3/2010 | Tsunoda |
| 7,689,710 B2 | 3/2010 | Tang et al. |
| 7,694,082 B2 | 4/2010 | Golding et al. |
| 7,698,453 B2 | 4/2010 | Samuels et al. |
| 7,698,458 B1 | 4/2010 | Liu et al. |
| 7,706,261 B2 | 4/2010 | Sun et al. |
| 7,711,771 B2 | 5/2010 | Kirnos |
| 7,724,657 B2 | 5/2010 | Rao et al. |

(56) References Cited

U.S. PATENT DOCUMENTS

| | | | |
|---|---|---|---|
| 7,725,093 | B2 | 5/2010 | Sengupta et al. |
| 7,725,657 | B2 | 5/2010 | Hasenplaugh et al. |
| 7,725,763 | B2 | 5/2010 | Vertes et al. |
| 7,734,603 | B1 | 6/2010 | McManis |
| 7,739,540 | B2 | 6/2010 | Akutsu et al. |
| 7,743,031 | B1 | 6/2010 | Cameron et al. |
| 7,743,035 | B2 | 6/2010 | Chen et al. |
| 7,752,294 | B2 | 7/2010 | Meyer et al. |
| 7,769,711 | B2 | 8/2010 | Srinivasan et al. |
| 7,769,860 | B1 | 8/2010 | Assadzadeh |
| 7,778,187 | B2 | 8/2010 | Chaturvedi et al. |
| 7,788,335 | B2 | 8/2010 | Miloushev et al. |
| 7,801,978 | B1 | 9/2010 | Susai et al. |
| 7,805,470 | B2 | 9/2010 | Armangau et al. |
| 7,808,913 | B2 | 10/2010 | Ansari et al. |
| 7,809,691 | B1 | 10/2010 | Karmarkar et al. |
| 7,818,299 | B1 | 10/2010 | Federwisch et al. |
| 7,822,839 | B1 | 10/2010 | Pruitt et al. |
| 7,822,939 | B1 | 10/2010 | Veprinsky et al. |
| 7,831,639 | B1 | 11/2010 | Panchbudhe et al. |
| 7,831,662 | B2 | 11/2010 | Clark et al. |
| 7,849,112 | B2 | 12/2010 | Mane et al. |
| 7,853,958 | B2 | 12/2010 | Mathew et al. |
| 7,856,026 | B1 | 12/2010 | Finan et al. |
| 7,861,085 | B1 | 12/2010 | Case et al. |
| 7,870,154 | B2 | 1/2011 | Shitomi et al. |
| 7,876,677 | B2 | 1/2011 | Cheshire |
| 7,877,511 | B1 | 1/2011 | Berger et al. |
| 7,885,970 | B2 | 2/2011 | Lacapra |
| 7,886,218 | B2 | 2/2011 | Watson |
| 7,895,653 | B2 | 2/2011 | Calo et al. |
| 7,900,002 | B2 | 3/2011 | Lyon |
| 7,903,554 | B1 | 3/2011 | Manur et al. |
| 7,904,466 | B1 | 3/2011 | Valencia et al. |
| 7,908,245 | B2 | 3/2011 | Nakano et al. |
| 7,908,314 | B2 | 3/2011 | Yamaguchi et al. |
| 7,913,053 | B1 | 3/2011 | Newland |
| 7,924,881 | B2 | 4/2011 | Frank et al. |
| 7,925,908 | B2 | 4/2011 | Kim |
| 7,930,365 | B2 | 4/2011 | Dixit et al. |
| 7,933,946 | B2 | 4/2011 | Livshits et al. |
| 7,937,421 | B2 | 5/2011 | Mikesell et al. |
| 7,945,908 | B1 | 5/2011 | Waldspurger et al. |
| 7,953,085 | B2 | 5/2011 | Chang et al. |
| 7,953,701 | B2 | 5/2011 | Okitsu et al. |
| 7,958,222 | B1 | 6/2011 | Pruitt et al. |
| 7,958,347 | B1 | 6/2011 | Ferguson |
| 7,958,435 | B2 | 6/2011 | Kure et al. |
| 7,984,108 | B2 | 7/2011 | Landis et al. |
| 7,984,141 | B2 | 7/2011 | Gupta et al. |
| 7,984,500 | B1 | 7/2011 | Khanna et al. |
| 8,005,953 | B2 | 8/2011 | Miloushev et al. |
| 8,015,157 | B2 | 9/2011 | Kamei et al. |
| 8,015,474 | B2 | 9/2011 | Izzat et al. |
| 8,024,443 | B1 | 9/2011 | Jacob |
| 8,037,528 | B2 | 10/2011 | Williams et al. |
| 8,041,022 | B1 | 10/2011 | Andreasen et al. |
| 8,046,547 | B1 | 10/2011 | Chatterjee et al. |
| 8,055,724 | B2 | 11/2011 | Amegadzie et al. |
| 8,060,017 | B2 | 11/2011 | Schlicht et al. |
| 8,064,342 | B2 | 11/2011 | Badger |
| 8,069,225 | B2 | 11/2011 | McCanne et al. |
| 8,074,107 | B2 | 12/2011 | Sivasubramanian et al. |
| 8,099,758 | B2 | 1/2012 | Schaefer et al. |
| 8,103,622 | B1 | 1/2012 | Karinta |
| 8,103,781 | B1 | 1/2012 | Wu et al. |
| 8,112,392 | B1 | 2/2012 | Bunnell et al. |
| 8,117,244 | B2 | 2/2012 | Marinov et al. |
| 8,130,650 | B2 | 3/2012 | Allen, Jr. et al. |
| 8,149,819 | B2 | 4/2012 | Kobayashi et al. |
| 8,155,128 | B2 | 4/2012 | Balyan et al. |
| 8,171,124 | B2 | 5/2012 | Kondamuru |
| 8,189,567 | B2 | 5/2012 | Kavanagh et al. |
| 8,190,769 | B1 | 5/2012 | Shukla et al. |
| 8,199,757 | B2 | 6/2012 | Pani et al. |
| 8,205,246 | B2 | 6/2012 | Shatzkamer et al. |
| 8,209,403 | B2 | 6/2012 | Szabo et al. |
| 8,239,954 | B2 | 8/2012 | Wobber et al. |
| 8,271,620 | B2 | 9/2012 | Witchey |
| 8,271,751 | B2 | 9/2012 | Hinrichs, Jr. |
| 8,274,895 | B2 | 9/2012 | Rahman et al. |
| 8,306,948 | B2 | 11/2012 | Chou et al. |
| 8,321,908 | B2 | 11/2012 | Gai et al. |
| 8,326,798 | B1 | 12/2012 | Driscoll et al. |
| 8,351,333 | B2 | 1/2013 | Rao et al. |
| 8,380,854 | B2 | 2/2013 | Szabo |
| 8,396,836 | B1 | 3/2013 | Ferguson et al. |
| 8,417,746 | B1 | 4/2013 | Gillett, Jr. et al. |
| 8,417,817 | B1 | 4/2013 | Jacobs |
| 8,605,583 | B2 | 4/2013 | Cutler |
| 8,447,871 | B1 | 5/2013 | Szabo |
| 8,447,970 | B2 | 5/2013 | Klein et al. |
| 8,452,876 | B1 | 5/2013 | Williams et al. |
| 8,463,850 | B1 | 6/2013 | McCann |
| 8,464,265 | B2 | 6/2013 | Worley |
| 8,468,247 | B1 | 6/2013 | Richardson et al. |
| 8,468,267 | B2 | 6/2013 | Yigang |
| 8,468,542 | B2 | 6/2013 | Jacobson et al. |
| 8,484,348 | B2 | 7/2013 | Subramanian et al. |
| 8,498,951 | B1 | 7/2013 | Baluja et al. |
| 8,521,851 | B1 | 8/2013 | Richardson et al. |
| 8,521,880 | B1 | 8/2013 | Richardson et al. |
| 8,359,224 | B2 | 9/2013 | Henderson et al. |
| 8,539,224 | B2 | 9/2013 | Henderson et al. |
| 8,566,474 | B2 | 10/2013 | Kanode et al. |
| 8,572,007 | B1 | 10/2013 | Manadhata et al. |
| 8,576,283 | B1 | 11/2013 | Foster et al. |
| 8,578,050 | B2 | 11/2013 | Craig et al. |
| 8,595,547 | B1 | 11/2013 | Sivasubramanian et al. |
| 8,601,000 | B1 | 12/2013 | Stefani et al. |
| 8,606,921 | B2 | 12/2013 | Vasquez et al. |
| 8,615,022 | B2 | 12/2013 | Harrison et al. |
| 8,620,879 | B2 | 12/2013 | Cairns |
| 8,646,067 | B2 | 2/2014 | Agarwal et al. |
| 8,665,868 | B2 | 3/2014 | Kay |
| 8,665,969 | B2 | 3/2014 | Kay |
| 8,676,753 | B2 | 3/2014 | Sivasubramanian et al. |
| 8,701,179 | B1 | 4/2014 | Penno et al. |
| 8,725,836 | B2 | 5/2014 | Lowery et al. |
| 8,726,338 | B2 | 5/2014 | Narayanaswamy et al. |
| 8,737,304 | B2 | 5/2014 | Karuturi et al. |
| 8,745,266 | B2 | 6/2014 | Agarwal et al. |
| 8,763,015 | B1 | 6/2014 | Caccavale |
| 8,788,665 | B2 | 7/2014 | Gilde et al. |
| 8,804,504 | B1 | 8/2014 | Chen |
| 8,819,109 | B1 | 8/2014 | Krishnamurthy et al. |
| 8,819,419 | B2 | 8/2014 | Carlson et al. |
| 8,819,768 | B1 | 8/2014 | Koeten et al. |
| 8,830,874 | B2 | 9/2014 | Cho et al. |
| 8,832,790 | B1 * | 9/2014 | Villa .......... H04L 63/123 726/2 |
| 8,838,817 | B1 | 9/2014 | Biswas |
| 8,873,753 | B2 | 10/2014 | Parker |
| 8,875,274 | B2 | 10/2014 | Montemurro et al. |
| 8,879,431 | B2 | 11/2014 | Ridel et al. |
| 8,886,981 | B1 | 11/2014 | Baumann et al. |
| 8,908,545 | B1 | 12/2014 | Chen et al. |
| 8,954,080 | B2 | 2/2015 | Janakiriman et al. |
| 8,959,215 | B2 | 2/2015 | Koponen et al. |
| 9,036,529 | B2 | 5/2015 | Erickson et al. |
| 9,037,166 | B2 | 5/2015 | de Wit et al. |
| 9,047,259 | B1 | 6/2015 | Ho et al. |
| 9,077,554 | B1 | 7/2015 | Szabo |
| 9,083,760 | B1 | 7/2015 | Hughes et al. |
| 9,143,451 | B2 | 9/2015 | Amdahl et al. |
| 9,172,753 | B1 | 10/2015 | Jiang |
| 9,244,843 | B1 | 1/2016 | Michels et al. |
| 9,246,819 | B1 | 1/2016 | Thirasuttakorn |
| 9,258,742 | B1 | 2/2016 | Pianigiani et al. |
| 9,497,614 | B1 | 11/2016 | Ridel et al. |
| 2001/0007137 | A1 | 7/2001 | Suumaki et al. |
| 2001/0007560 | A1 | 7/2001 | Masuda et al. |
| 2001/0009554 | A1 | 7/2001 | Katseff et al. |
| 2001/0023442 | A1 | 9/2001 | Masters |

(56) References Cited

U.S. PATENT DOCUMENTS

| | | |
|---|---|---|
| 2001/0030970 A1 | 10/2001 | Wiryaman et al. |
| 2001/0047293 A1 | 11/2001 | Waller et al. |
| 2001/0049717 A1 | 12/2001 | Freeman et al. |
| 2002/0002688 A1* | 1/2002 | Gregg .................. G06F 21/10 726/3 |
| 2002/0006790 A1 | 1/2002 | Blumenstock et al. |
| 2002/0010757 A1 | 1/2002 | Granik et al. |
| 2002/0010783 A1 | 1/2002 | Primak et al. |
| 2002/0010866 A1 | 1/2002 | McCullough et al. |
| 2002/0012352 A1 | 1/2002 | Hansson et al. |
| 2002/0012382 A1 | 1/2002 | Schilling |
| 2002/0016827 A1 | 2/2002 | McCabe et al. |
| 2002/0016851 A1 | 2/2002 | Border |
| 2002/0032489 A1 | 3/2002 | Tynan et al. |
| 2002/0032777 A1 | 3/2002 | Kawata et al. |
| 2002/0034173 A1 | 3/2002 | Border et al. |
| 2002/0035537 A1 | 3/2002 | Waller et al. |
| 2002/0035683 A1 | 3/2002 | Kaashoek et al. |
| 2002/0038360 A1 | 3/2002 | Andrews et al. |
| 2002/0041592 A1 | 4/2002 | Van Der Zee et al. |
| 2002/0046291 A1 | 4/2002 | O'Callaghan et al. |
| 2002/0049608 A1 | 4/2002 | Hartsell et al. |
| 2002/0049842 A1 | 4/2002 | Huetsch et al. |
| 2002/0052928 A1 | 5/2002 | Stern et al. |
| 2002/0052931 A1 | 5/2002 | Peiffer et al. |
| 2002/0059263 A1 | 5/2002 | Shima et al. |
| 2002/0059428 A1 | 5/2002 | Susai et al. |
| 2002/0059622 A1 | 5/2002 | Grove et al. |
| 2002/0065848 A1 | 5/2002 | Walker et al. |
| 2002/0065864 A1 | 5/2002 | Hartsell et al. |
| 2002/0071434 A1 | 6/2002 | Furukawa |
| 2002/0071436 A1 | 6/2002 | Border et al. |
| 2002/0071438 A1 | 6/2002 | Singh |
| 2002/0072048 A1 | 6/2002 | Slattery et al. |
| 2002/0073167 A1 | 6/2002 | Powell et al. |
| 2002/0080721 A1 | 6/2002 | Tobagi et al. |
| 2002/0083067 A1 | 6/2002 | Tamayo et al. |
| 2002/0083205 A1 | 6/2002 | Leon et al. |
| 2002/0085585 A1 | 7/2002 | Tzeng |
| 2002/0087571 A1 | 7/2002 | Stapel et al. |
| 2002/0087744 A1 | 7/2002 | Kitchin |
| 2002/0087887 A1 | 7/2002 | Busam et al. |
| 2002/0089930 A1 | 7/2002 | Aceves et al. |
| 2002/0089972 A1 | 7/2002 | Chang et al. |
| 2002/0089977 A1 | 7/2002 | Chang et al. |
| 2002/0090006 A1 | 7/2002 | Chang et al. |
| 2002/0091884 A1 | 7/2002 | Chang et al. |
| 2002/0095400 A1 | 7/2002 | Johnson et al. |
| 2002/0095498 A1 | 7/2002 | Chanda et al. |
| 2002/0095511 A1 | 7/2002 | Walker |
| 2002/0097713 A1 | 7/2002 | Chang et al. |
| 2002/0098840 A1 | 7/2002 | Hanson et al. |
| 2002/0099829 A1 | 7/2002 | Richards et al. |
| 2002/0099842 A1 | 7/2002 | Jennings et al. |
| 2002/0099851 A1 | 7/2002 | Shah et al. |
| 2002/0101860 A1 | 8/2002 | Thornton et al. |
| 2002/0103823 A1 | 8/2002 | Jackson et al. |
| 2002/0105972 A1 | 8/2002 | Richter et al. |
| 2002/0106263 A1 | 8/2002 | Winker |
| 2002/0107903 A1 | 8/2002 | Richter et al. |
| 2002/0107962 A1 | 8/2002 | Richter et al. |
| 2002/0107971 A1 | 8/2002 | Bailey et al. |
| 2002/0107989 A1 | 8/2002 | Johnson et al. |
| 2002/0107990 A1 | 8/2002 | Johnson et al. |
| 2002/0108059 A1 | 8/2002 | Canion et al. |
| 2002/0112061 A1 | 8/2002 | Shih et al. |
| 2002/0112152 A1 | 8/2002 | VanHeyningen et al. |
| 2002/0115407 A1 | 8/2002 | Thompson et al. |
| 2002/0116452 A1 | 8/2002 | Johnson et al. |
| 2002/0120763 A1 | 8/2002 | Miloushev et al. |
| 2002/0138551 A1 | 9/2002 | Erickson |
| 2002/0138615 A1 | 9/2002 | Schmeling |
| 2002/0138618 A1 | 9/2002 | Szabo |
| 2002/0141339 A1 | 10/2002 | Konuma |
| 2002/0141418 A1 | 10/2002 | Ben-Dor et al. |
| 2002/0143819 A1 | 10/2002 | Han et al. |
| 2002/0143852 A1 | 10/2002 | Guo et al. |
| 2002/0143909 A1 | 10/2002 | Botz et al. |
| 2002/0147822 A1 | 10/2002 | Susai et al. |
| 2002/0150048 A1 | 10/2002 | Ha et al. |
| 2002/0150064 A1 | 10/2002 | Lucidarme |
| 2002/0150253 A1 | 10/2002 | Brezak et al. |
| 2002/0156905 A1 | 10/2002 | Weissman |
| 2002/0161911 A1 | 10/2002 | Pinckney, III et al. |
| 2002/0161913 A1 | 10/2002 | Gonzalez et al. |
| 2002/0162118 A1 | 10/2002 | Levy et al. |
| 2002/0174216 A1 | 11/2002 | Shorey et al. |
| 2002/0178410 A1 | 11/2002 | Haitsma et al. |
| 2002/0186661 A1 | 12/2002 | Santiago et al. |
| 2002/0188001 A1 | 12/2002 | Xu et al. |
| 2002/0188753 A1 | 12/2002 | Tang et al. |
| 2002/0191600 A1 | 12/2002 | Shah et al. |
| 2002/0191612 A1 | 12/2002 | Curtis |
| 2002/0194112 A1 | 12/2002 | DePinto et al. |
| 2002/0194317 A1 | 12/2002 | Kanada et al. |
| 2002/0194342 A1 | 12/2002 | Lu et al. |
| 2002/0198956 A1 | 12/2002 | Dunshea et al. |
| 2002/0198993 A1 | 12/2002 | Cudd et al. |
| 2003/0002484 A1 | 1/2003 | Freedman |
| 2003/0005172 A1 | 1/2003 | Chessell |
| 2003/0009528 A1 | 1/2003 | Sharif et al. |
| 2003/0012382 A1 | 1/2003 | Ferchichi et al. |
| 2003/0014623 A1 | 1/2003 | Freed et al. |
| 2003/0014625 A1 | 1/2003 | Freed et al. |
| 2003/0014628 A1 | 1/2003 | Freed et al. |
| 2003/0018450 A1 | 1/2003 | Carley |
| 2003/0018585 A1 | 1/2003 | Butler et al. |
| 2003/0026241 A1 | 2/2003 | Ono et al. |
| 2003/0028514 A1 | 2/2003 | Lord et al. |
| 2003/0033308 A1 | 2/2003 | Patel et al. |
| 2003/0033520 A1 | 2/2003 | Pfeiffer et al. |
| 2003/0033535 A1 | 2/2003 | Fisher et al. |
| 2003/0034905 A1 | 2/2003 | Anton et al. |
| 2003/0035370 A1 | 2/2003 | Brustoloni |
| 2003/0035413 A1 | 2/2003 | Herle et al. |
| 2003/0037070 A1 | 2/2003 | Marston |
| 2003/0046291 A1 | 3/2003 | Fascenda |
| 2003/0051045 A1 | 3/2003 | Connor |
| 2003/0051046 A1 | 3/2003 | Connor |
| 2003/0055723 A1 | 3/2003 | English |
| 2003/0065653 A1 | 4/2003 | Overton et al. |
| 2003/0065762 A1 | 4/2003 | Stolorz et al. |
| 2003/0065951 A1 | 4/2003 | Igeta et al. |
| 2003/0065956 A1 | 4/2003 | Belapurkar et al. |
| 2003/0069918 A1 | 4/2003 | Lu et al. |
| 2003/0069974 A1 | 4/2003 | Lu et al. |
| 2003/0070069 A1 | 4/2003 | Belapurkar et al. |
| 2003/0074301 A1 | 4/2003 | Solomon |
| 2003/0076224 A1 | 4/2003 | Braune |
| 2003/0086403 A1 | 5/2003 | Harris et al. |
| 2003/0086415 A1 | 5/2003 | Bernhard et al. |
| 2003/0093691 A1 | 5/2003 | Simon et al. |
| 2003/0103472 A1 | 6/2003 | Taylor et al. |
| 2003/0105807 A1 | 6/2003 | Thompson et al. |
| 2003/0105846 A1 | 6/2003 | Zhao et al. |
| 2003/0105977 A1 | 6/2003 | Brabson et al. |
| 2003/0105983 A1 | 6/2003 | Brakimo et al. |
| 2003/0108000 A1 | 6/2003 | Chaney et al. |
| 2003/0108002 A1 | 6/2003 | Chaney et al. |
| 2003/0108052 A1 | 6/2003 | Inoue et al. |
| 2003/0112809 A1 | 6/2003 | Bharali et al. |
| 2003/0115331 A1 | 6/2003 | Xie et al. |
| 2003/0117992 A1 | 6/2003 | Kim et al. |
| 2003/0118035 A1 | 6/2003 | Sharma et al. |
| 2003/0119556 A1 | 6/2003 | Khan et al. |
| 2003/0120802 A1 | 6/2003 | Kohno |
| 2003/0120811 A1 | 6/2003 | Hanson et al. |
| 2003/0120948 A1 | 6/2003 | Schmidt et al. |
| 2003/0123394 A1 | 7/2003 | Neale et al. |
| 2003/0123481 A1 | 7/2003 | Neale et al. |
| 2003/0128704 A1 | 7/2003 | Mizrachi et al. |
| 2003/0128708 A1 | 7/2003 | Inoue et al. |
| 2003/0130945 A1 | 7/2003 | Force |
| 2003/0131079 A1 | 7/2003 | Neale et al. |

(56) References Cited

U.S. PATENT DOCUMENTS

| | | |
|---|---|---|
| 2003/0131263 A1 | 7/2003 | Keane et al. |
| 2003/0139934 A1 | 7/2003 | Mandera |
| 2003/0140210 A1 | 7/2003 | Testardi |
| 2003/0143959 A1 | 7/2003 | Harris et al. |
| 2003/0145062 A1 | 7/2003 | Sharma et al. |
| 2003/0145233 A1 | 7/2003 | Poletto et al. |
| 2003/0149715 A1 | 8/2003 | Ruutu et al. |
| 2003/0156586 A1 | 8/2003 | Lee et al. |
| 2003/0159072 A1 | 8/2003 | Bellinger et al. |
| 2003/0163576 A1 | 8/2003 | Janssen et al. |
| 2003/0171978 A1 | 9/2003 | Jenkins et al. |
| 2003/0177364 A1 | 9/2003 | Walsh et al. |
| 2003/0177388 A1 | 9/2003 | Botz et al. |
| 2003/0179755 A1 | 9/2003 | Fraser |
| 2003/0018993 A1 | 10/2003 | Terrell et al. |
| 2003/0187975 A1 | 10/2003 | Brown et al. |
| 2003/0188195 A1 | 10/2003 | Abdo et al. |
| 2003/0189936 A1 | 10/2003 | Terrell et al. |
| 2003/0191799 A1 | 10/2003 | Araujo et al. |
| 2003/0191812 A1 | 10/2003 | Agarwalla et al. |
| 2003/0193893 A1 | 10/2003 | Wen et al. |
| 2003/0195813 A1 | 10/2003 | Pallister et al. |
| 2003/0195962 A1 | 10/2003 | Kikuchi et al. |
| 2003/0200207 A1 | 10/2003 | Dickinson |
| 2003/0200284 A1 | 10/2003 | Philbrick et al. |
| 2003/0200290 A1 | 10/2003 | Zimmerman et al. |
| 2003/0202480 A1 | 10/2003 | Swami |
| 2003/0204635 A1 | 10/2003 | Ko et al. |
| 2003/0208596 A1 | 11/2003 | Carolan et al. |
| 2003/0212954 A1 | 11/2003 | Patrudu |
| 2003/0220835 A1 | 11/2003 | Barnes, Jr. |
| 2003/0223361 A1 | 12/2003 | Hussain et al. |
| 2003/0225485 A1 | 12/2003 | Fritz et al. |
| 2003/0226038 A1 | 12/2003 | Raanan et al. |
| 2003/0229665 A1 | 12/2003 | Ryman |
| 2003/0229718 A1 | 12/2003 | Tock et al. |
| 2003/0233385 A1 | 12/2003 | Srinivasa et al. |
| 2003/0233581 A1 | 12/2003 | Reshef et al. |
| 2003/0235196 A1 | 12/2003 | Blachandran et al. |
| 2003/0236837 A1 | 12/2003 | Johnson et al. |
| 2003/0236887 A1 | 12/2003 | Kesselman et al. |
| 2003/0236919 A1 | 12/2003 | Johnson et al. |
| 2003/0236995 A1 | 12/2003 | Fretwell, Jr. |
| 2004/0001691 A1 | 1/2004 | Li et al. |
| 2004/0003266 A1 | 1/2004 | Moshir et al. |
| 2004/0003287 A1 | 1/2004 | Zissimopoulos et al. |
| 2004/0006575 A1 | 1/2004 | Visharam et al. |
| 2004/0006590 A1 | 1/2004 | Lucovsky et al. |
| 2004/0006591 A1 | 1/2004 | Matsui et al. |
| 2004/0006643 A1 | 1/2004 | Dolson et al. |
| 2004/0008693 A1 | 1/2004 | Grove et al. |
| 2004/0010654 A1 | 1/2004 | Yasuda et al. |
| 2004/0015591 A1 | 1/2004 | Wang |
| 2004/0015783 A1 | 1/2004 | Lennon et al. |
| 2004/0017825 A1 | 1/2004 | Stanwood et al. |
| 2004/0022263 A1 | 2/2004 | Zhao et al. |
| 2004/0028043 A1 | 2/2004 | Maveli et al. |
| 2004/0030627 A1 | 2/2004 | Sedukhin |
| 2004/0030740 A1 | 2/2004 | Stelting |
| 2004/0030857 A1 | 2/2004 | Krakirian et al. |
| 2004/0031058 A1 | 2/2004 | Reisman |
| 2004/0043758 A1 | 3/2004 | Sorvari et al. |
| 2004/0044705 A1 | 3/2004 | Stager et al. |
| 2004/0054748 A1 | 3/2004 | Ackaouy et al. |
| 2004/0059789 A1 | 3/2004 | Shum |
| 2004/0064544 A1 | 4/2004 | Barsness et al. |
| 2004/0064554 A1 | 4/2004 | Kuno et al. |
| 2004/0072569 A1 | 4/2004 | Omae et al. |
| 2004/0078465 A1 | 4/2004 | Coates et al. |
| 2004/0085902 A1 | 5/2004 | Miller et al. |
| 2004/0093361 A1 | 5/2004 | Therrien et al. |
| 2004/0093474 A1 | 5/2004 | Lin et al. |
| 2004/0098595 A1 | 5/2004 | Aupperle et al. |
| 2004/0103283 A1 | 5/2004 | Hornak |
| 2004/0103438 A1 | 5/2004 | Yan et al. |
| 2004/0107360 A1 | 6/2004 | Herrmann et al. |
| 2004/0111523 A1 | 6/2004 | Hall et al. |
| 2004/0111621 A1 | 6/2004 | Himberger et al. |
| 2004/0117493 A1 | 6/2004 | Bazot et al. |
| 2004/0122926 A1 | 6/2004 | Moore et al. |
| 2004/0123277 A1 | 6/2004 | Schrader et al. |
| 2004/0127131 A1 | 7/2004 | Potnis |
| 2004/0133577 A1 | 7/2004 | Miloushev et al. |
| 2004/0133605 A1 | 7/2004 | Chang et al. |
| 2004/0133606 A1 | 7/2004 | Miloushev et al. |
| 2004/0136379 A1 | 7/2004 | Liao et al. |
| 2004/0138858 A1 | 7/2004 | Carley |
| 2004/0139355 A1 | 7/2004 | Axel et al. |
| 2004/0141525 A1 | 7/2004 | Bhushan et al. |
| 2004/0141185 A1 | 8/2004 | Akama |
| 2004/0151186 A1 | 8/2004 | Akama |
| 2004/0153479 A1 | 8/2004 | Mikesell et al. |
| 2004/0167967 A1 | 8/2004 | Bastian et al. |
| 2004/0174886 A1 | 9/2004 | Packer |
| 2004/0177165 A1 | 9/2004 | Masputra et al. |
| 2004/0192312 A1 | 9/2004 | Li et al. |
| 2004/0196785 A1 | 10/2004 | Janakiraman et al. |
| 2004/0199547 A1 | 10/2004 | Winter et al. |
| 2004/0199762 A1 | 10/2004 | Carlson et al. |
| 2004/0210663 A1 | 10/2004 | Phillips et al. |
| 2004/0213156 A1 | 10/2004 | Smallwood et al. |
| 2004/0215665 A1 | 10/2004 | Edgar et al. |
| 2004/0236798 A1 | 11/2004 | Srinivasan et al. |
| 2004/0236826 A1 | 11/2004 | Harville et al. |
| 2004/0250032 A1 | 12/2004 | Ji et al. |
| 2004/0250124 A1 | 12/2004 | Chesla et al. |
| 2004/0254919 A1 | 12/2004 | Giuseppini |
| 2004/0255000 A1 | 12/2004 | Simionescu et al. |
| 2004/0258003 A1 | 12/2004 | Kokot et al. |
| 2004/0264377 A1 | 12/2004 | Kilkki et al. |
| 2004/0264433 A1 | 12/2004 | Melpignano |
| 2004/0264472 A1 | 12/2004 | Oliver et al. |
| 2004/0264481 A1 | 12/2004 | Darling et al. |
| 2004/0267920 A1 | 12/2004 | Hydrie et al. |
| 2004/0267948 A1 | 12/2004 | Oliver et al. |
| 2004/0268358 A1 | 12/2004 | Darling et al. |
| 2005/0004887 A1 | 1/2005 | Igakura et al. |
| 2005/0008017 A1 | 1/2005 | Datta et al. |
| 2005/0013280 A1 | 1/2005 | Buddhikot et al. |
| 2005/0021703 A1 | 1/2005 | Cherry et al. |
| 2005/0021736 A1 | 1/2005 | Carusi et al. |
| 2005/0021864 A1 | 1/2005 | Sherman et al. |
| 2005/0144186 A1 | 1/2005 | Hesselink et al. |
| 2005/0027841 A1 | 2/2005 | Rolfe |
| 2005/0027862 A1 | 2/2005 | Nguyen et al. |
| 2005/0027869 A1 | 2/2005 | Johnson |
| 2005/0044158 A1 | 2/2005 | Malik |
| 2005/0044213 A1 | 2/2005 | Kobayashi et al. |
| 2005/0045556 A1 | 3/2005 | Kryzak |
| 2005/0050107 A1 | 3/2005 | Mane et al. |
| 2005/0052440 A1 | 3/2005 | Kim et al. |
| 2005/0055435 A1 | 3/2005 | Gbadegesin et al. |
| 2005/0071283 A1 | 3/2005 | Randle et al. |
| 2005/0071589 A1 | 3/2005 | Tross et al. |
| 2005/0074007 A1 | 4/2005 | Samuels et al. |
| 2005/0078171 A1 | 4/2005 | Firestone et al. |
| 2005/0078604 A1 | 4/2005 | Yim |
| 2005/0080876 A1 | 4/2005 | Peiffer et al. |
| 2005/0088966 A9 | 4/2005 | Stewart |
| 2005/0089004 A1 | 4/2005 | Casaccia et al. |
| 2005/0089010 A1 | 4/2005 | Rue et al. |
| 2005/0089049 A1 | 4/2005 | Chang et al. |
| 2005/0091214 A1 | 4/2005 | Probert et al. |
| 2005/0097358 A1 | 5/2005 | Yanovsky |
| 2005/0108575 A1 | 5/2005 | Yung |
| 2005/0111371 A1 | 5/2005 | Miura et al. |
| 2005/0114186 A1 | 5/2005 | Heinrich |
| 2005/0114701 A1 | 5/2005 | Atkins et al. |
| 2005/0117589 A1 | 6/2005 | Douady et al. |
| 2005/0122942 A1 | 6/2005 | Rhee et al. |
| 2005/0122977 A1 | 6/2005 | Lieberman |
| 2005/0125688 A1 | 6/2005 | Ogawa |
| 2005/0135250 A1 | 6/2005 | Singh et al. |
| 2005/0135252 A1 | 6/2005 | Singh et al. |

(56) References Cited

U.S. PATENT DOCUMENTS

| | | |
|---|---|---|
| 2005/0141507 A1 | 6/2005 | Curtis |
| 2005/0149481 A1 | 7/2005 | Hesselink et al. |
| 2005/0152397 A1 | 7/2005 | Bai et al. |
| 2005/0154837 A1 | 7/2005 | Keohane et al. |
| 2005/0160161 A1 | 7/2005 | Barrett et al. |
| 2005/0160243 A1 | 7/2005 | Lubbers et al. |
| 2005/0165656 A1 | 7/2005 | Frederick et al. |
| 2005/0017494 A1 | 8/2005 | Legault et al. |
| 2005/0174944 A1 | 8/2005 | Legault et al. |
| 2005/0175013 A1 | 8/2005 | Le Pennec et al. |
| 2005/0187866 A1 | 8/2005 | Lee |
| 2005/0188220 A1 | 8/2005 | Nilsson et al. |
| 2005/0193245 A1 | 9/2005 | Hayden et al. |
| 2005/0195835 A1 | 9/2005 | Savage et al. |
| 2005/0198234 A1 | 9/2005 | Leib et al. |
| 2005/0198310 A1 | 9/2005 | Kim et al. |
| 2005/0198501 A1 | 9/2005 | Andreev et al. |
| 2005/0207619 A1 | 9/2005 | Lohmann |
| 2005/0213587 A1 | 9/2005 | Cho et al. |
| 2005/0220086 A1 | 10/2005 | Dowling |
| 2005/0223114 A1 | 10/2005 | Hanson et al. |
| 2005/0223115 A1 | 10/2005 | Hanson et al. |
| 2005/0229237 A1 | 10/2005 | Xie et al. |
| 2005/0232161 A1 | 10/2005 | Maufer et al. |
| 2005/0234928 A1 | 10/2005 | Shkvarchuk et al. |
| 2005/0240664 A1 | 10/2005 | Chen et al. |
| 2005/0246393 A1 | 11/2005 | Coates et al. |
| 2005/0256806 A1 | 11/2005 | Tien et al. |
| 2005/0262238 A1 | 11/2005 | Reeves et al. |
| 2005/0265353 A1 | 12/2005 | Sengupta et al. |
| 2005/0273456 A1 | 12/2005 | Revanuru et al. |
| 2005/0288939 A1 | 12/2005 | Peled et al. |
| 2005/0289111 A1 | 12/2005 | Tribble et al. |
| 2006/0010502 A1 | 1/2006 | Mimatsu et al. |
| 2006/0031374 A1 | 2/2006 | Lu et al. |
| 2006/0031520 A1 | 2/2006 | Bedekar et al. |
| 2006/0031778 A1 | 2/2006 | Goodwin et al. |
| 2006/0036764 A1 | 2/2006 | Yokota et al. |
| 2006/0039287 A1 | 2/2006 | Hasegawa et al. |
| 2006/0045089 A1 | 3/2006 | Bacher et al. |
| 2006/0045096 A1 | 3/2006 | Farmer et al. |
| 2006/0047785 A1 | 3/2006 | Wang et al. |
| 2006/0049340 A1 | 3/2006 | Haberer et al. |
| 2006/0059005 A1 | 3/2006 | Horn et al. |
| 2006/0059267 A1 | 3/2006 | Cugi et al. |
| 2006/0059400 A1 | 3/2006 | Clark et al. |
| 2006/0059484 A1 | 3/2006 | Selvaggi |
| 2006/0064716 A1 | 3/2006 | Sull et al. |
| 2006/0067222 A1 | 3/2006 | Endoh |
| 2006/0074922 A1 | 4/2006 | Nishimura |
| 2006/0075475 A1 | 4/2006 | Boulos et al. |
| 2006/0077902 A1 | 4/2006 | Kannan et al. |
| 2006/0077986 A1 | 4/2006 | Rune |
| 2006/0080353 A1 | 4/2006 | Miloushev et al. |
| 2006/0083205 A1 | 4/2006 | Buddhikot et al. |
| 2006/0095573 A1 | 5/2006 | Carle et al. |
| 2006/0100752 A1 | 5/2006 | Kim et al. |
| 2006/0106802 A1 | 5/2006 | Giblin et al. |
| 2006/0106882 A1 | 5/2006 | Douceur et al. |
| 2006/0112176 A1 | 5/2006 | Liu et al. |
| 2006/0112272 A1 | 5/2006 | Morioka et al. |
| 2006/0112367 A1 | 5/2006 | Harris |
| 2006/0112399 A1 | 5/2006 | Lessly |
| 2006/0113223 A1 | 6/2006 | Grimm et al. |
| 2006/0123062 A1 | 6/2006 | Bobbitt et al. |
| 2006/0123210 A1 | 6/2006 | Pritchett et al. |
| 2006/0126535 A1 | 6/2006 | Sherman |
| 2006/0126616 A1 | 6/2006 | Bhatia |
| 2006/0129684 A1 | 6/2006 | Datta |
| 2006/0130133 A1 | 6/2006 | Andreev et al. |
| 2006/0133374 A1 | 6/2006 | Sekiguchi |
| 2006/0135198 A1 | 6/2006 | Lee |
| 2006/0140193 A1 | 6/2006 | Kakani et al. |
| 2006/0153201 A1 | 7/2006 | Hepper et al. |
| 2006/0156416 A1 | 7/2006 | Huotari et al. |
| 2006/0161577 A1 | 7/2006 | Kulkarni et al. |
| 2006/0167838 A1 | 7/2006 | Lacapra |
| 2006/0168070 A1 | 7/2006 | Thompson et al. |
| 2006/0171365 A1 | 8/2006 | Borella |
| 2006/0179153 A1 | 8/2006 | Lee et al. |
| 2006/0179261 A1 | 8/2006 | Rajan |
| 2006/0182103 A1 | 8/2006 | Martini et al. |
| 2006/0184589 A1 | 8/2006 | Lees et al. |
| 2006/0184647 A1 | 8/2006 | Dixit et al. |
| 2006/0200470 A1 | 9/2006 | Lacapra et al. |
| 2006/0206931 A1 | 9/2006 | Dillaway et al. |
| 2006/0209669 A1 | 9/2006 | Nishio |
| 2006/0209853 A1 | 9/2006 | Hidaka et al. |
| 2006/0215556 A1 | 9/2006 | Wu et al. |
| 2006/0215684 A1 | 9/2006 | Capone |
| 2006/0218135 A1 | 9/2006 | Bisson et al. |
| 2006/0224636 A1 | 10/2006 | Kathuria et al. |
| 2006/0224687 A1 | 10/2006 | Popkin et al. |
| 2006/0229861 A1 | 10/2006 | Tatsuoka et al. |
| 2006/0230148 A1 | 10/2006 | Forecast et al. |
| 2006/0230265 A1 | 10/2006 | Krishna |
| 2006/0233106 A1 | 10/2006 | Achlioptas et al. |
| 2006/0233178 A1 | 10/2006 | Lu et al. |
| 2006/0235998 A1 | 10/2006 | Stechler et al. |
| 2006/0242179 A1 | 10/2006 | Chen et al. |
| 2006/0242300 A1 | 10/2006 | Yumoto et al. |
| 2006/0259320 A1 | 11/2006 | LaSalle et al. |
| 2006/0259607 A1 | 11/2006 | O'Neal |
| 2006/0259949 A1 | 11/2006 | Schaefer et al. |
| 2006/0268692 A1 | 11/2006 | Wright et al. |
| 2006/0268704 A1 | 11/2006 | Ansari et al. |
| 2006/0270341 A1 | 11/2006 | Kim et al. |
| 2006/0271598 A1 | 11/2006 | Wong et al. |
| 2006/0277225 A1 | 12/2006 | Mark et al. |
| 2006/0282442 A1 | 12/2006 | Lennon et al. |
| 2006/0282461 A1 | 12/2006 | Marinescu |
| 2006/0282471 A1 | 12/2006 | Mark et al. |
| 2006/0291483 A1 | 12/2006 | Sela |
| 2006/0294054 A1 | 12/2006 | Kudo et al. |
| 2006/0294164 A1 | 12/2006 | Armangau et al. |
| 2007/0005807 A1 | 1/2007 | Wong |
| 2007/0006293 A1 | 1/2007 | Balakrishnan et al. |
| 2007/0008883 A1 | 1/2007 | Kobayashi |
| 2007/0016613 A1 | 1/2007 | Foresti et al. |
| 2007/0016662 A1 | 1/2007 | Desai et al. |
| 2007/0016754 A1 | 1/2007 | Testardi |
| 2007/0019636 A1 | 1/2007 | Lau et al. |
| 2007/0019658 A1 | 1/2007 | Park et al. |
| 2007/0024919 A1 | 2/2007 | Wong et al. |
| 2007/0027929 A1 | 2/2007 | Whelan |
| 2007/0027935 A1 | 2/2007 | Haselton et al. |
| 2007/0028068 A1 | 2/2007 | Golding et al. |
| 2007/0038994 A1 | 2/2007 | Davis et al. |
| 2007/0050843 A1 | 3/2007 | Manville et al. |
| 2007/0058670 A1 | 3/2007 | Konduru et al. |
| 2007/0060152 A1 | 3/2007 | Sakamoto |
| 2007/0061441 A1 | 3/2007 | Landis et al. |
| 2007/0064661 A1 | 3/2007 | Sood et al. |
| 2007/0067771 A1 | 3/2007 | Kulbak et al. |
| 2007/0079222 A1 | 4/2007 | Kure et al. |
| 2007/0083646 A1 | 4/2007 | Miller et al. |
| 2007/0086485 A1 | 4/2007 | Vega-Garcia et al. |
| 2007/0088702 A1 | 4/2007 | Fridella et al. |
| 2007/0088822 A1 | 4/2007 | Coile et al. |
| 2007/0106681 A1 | 5/2007 | Haot et al. |
| 2007/0106796 A1 | 5/2007 | Kudo et al. |
| 2007/0107048 A1 | 5/2007 | Halls et al. |
| 2007/0112775 A1 | 5/2007 | Ackerman |
| 2007/0118879 A1 | 5/2007 | Yeun |
| 2007/0124415 A1 | 5/2007 | Lev-Ran et al. |
| 2007/0124502 A1 | 5/2007 | Li |
| 2007/0124584 A1* | 5/2007 | Gupta ............... H04L 9/3271 713/168 |
| 2007/0130255 A1 | 6/2007 | Wolovitz et al. |
| 2007/0136308 A1 | 6/2007 | Tsirigotis et al. |
| 2007/0147246 A1 | 6/2007 | Hurley et al. |
| 2007/0160063 A1 | 7/2007 | Mynam et al. |
| 2007/0162891 A1 | 7/2007 | Burner et al. |
| 2007/0168320 A1 | 7/2007 | Borthakur et al. |

(56) References Cited

U.S. PATENT DOCUMENTS

| | | |
|---|---|---|
| 2007/0168525 A1 | 7/2007 | DeLeon et al. |
| 2007/0174491 A1 | 7/2007 | Still et al. |
| 2007/0180314 A1 | 8/2007 | Kawashima et al. |
| 2007/0192329 A1* | 8/2007 | Croft .................... G06F 3/1415 |
| 2007/0192543 A1 | 8/2007 | Naik et al. |
| 2007/0206621 A1 | 9/2007 | Plamondon et al. |
| 2007/0208748 A1 | 9/2007 | Li |
| 2007/0209075 A1 | 9/2007 | Coffman |
| 2007/0220598 A1 | 9/2007 | Salowey et al. |
| 2007/0223379 A1 | 9/2007 | Sivakumar et al. |
| 2007/0233809 A1 | 10/2007 | Brownell et al. |
| 2007/0233826 A1 | 10/2007 | Tindal et al. |
| 2007/0239944 A1 | 10/2007 | Rupanagunta et al. |
| 2007/0250560 A1 | 10/2007 | Wein et al. |
| 2007/0258451 A1 | 11/2007 | Bouat |
| 2007/0260830 A1 | 11/2007 | Faibish et al. |
| 2007/0260970 A1 | 11/2007 | Dorwart |
| 2007/0291778 A1 | 12/2007 | Huang et al. |
| 2007/0297410 A1 | 12/2007 | Yoon et al. |
| 2007/0297551 A1 | 12/2007 | Choi |
| 2008/0004022 A1 | 1/2008 | Johannesson et al. |
| 2008/0008202 A1 | 1/2008 | Terrell et al. |
| 2008/0010372 A1 | 1/2008 | Khendouri et al. |
| 2008/0010563 A1 | 1/2008 | Nishimura |
| 2008/0021597 A1 | 1/2008 | Merte et al. |
| 2008/0022059 A1 | 1/2008 | Zimmerer et al. |
| 2008/0025297 A1 | 1/2008 | Kashyap |
| 2008/0031258 A1 | 2/2008 | Acharya et al. |
| 2008/0034136 A1 | 2/2008 | Ulenas |
| 2008/0040509 A1 | 2/2008 | Werb |
| 2008/0046432 A1 | 2/2008 | Anderson et al. |
| 2008/0070575 A1 | 3/2008 | Claussen et al. |
| 2008/0072303 A1 | 3/2008 | Syed |
| 2008/0104347 A1 | 5/2008 | Iwamura et al. |
| 2008/0114718 A1 | 5/2008 | Anderson et al. |
| 2008/0120370 A1 | 5/2008 | Chan et al. |
| 2008/0120592 A1 | 5/2008 | Tanguay et al. |
| 2008/0133518 A1 | 6/2008 | Kapoor et al. |
| 2008/0134005 A1 | 6/2008 | Izzat et al. |
| 2008/0134311 A1 | 6/2008 | Medvinsky et al. |
| 2008/0141246 A1 | 6/2008 | Kuck et al. |
| 2008/0148135 A1 | 6/2008 | Hughes et al. |
| 2008/0148340 A1 | 6/2008 | Powell et al. |
| 2008/0151917 A1 | 6/2008 | Bartlett et al. |
| 2008/0159145 A1 | 7/2008 | Muthukrishnan et al. |
| 2008/0165801 A1 | 7/2008 | Sheppard |
| 2008/0178278 A1 | 7/2008 | Grinstein et al. |
| 2008/0189468 A1 | 8/2008 | Schmidt et al. |
| 2008/0189757 A1 | 8/2008 | Schackow |
| 2008/0200207 A1 | 8/2008 | Donahue et al. |
| 2008/0201599 A1 | 8/2008 | Ferraiolo et al. |
| 2008/0205613 A1 | 8/2008 | Lopez |
| 2008/0208917 A1 | 8/2008 | Smoot et al. |
| 2008/0208933 A1 | 8/2008 | Lyon |
| 2008/0209073 A1 | 8/2008 | Tang |
| 2008/0215836 A1 | 9/2008 | Sutoh et al. |
| 2008/0222223 A1 | 9/2008 | Srinivasan et al. |
| 2008/0222646 A1 | 9/2008 | Sigal et al. |
| 2008/0224889 A1 | 9/2008 | Wyk |
| 2008/0225710 A1 | 9/2008 | Raja et al. |
| 2008/0229415 A1 | 9/2008 | Kapoor et al. |
| 2008/0235508 A1 | 9/2008 | Ran et al. |
| 2008/0239953 A1 | 10/2008 | Bai et al. |
| 2008/0239986 A1 | 10/2008 | Xu et al. |
| 2008/0243769 A1 | 10/2008 | Arbour et al. |
| 2008/0253395 A1 | 10/2008 | Pandya |
| 2008/0256224 A1 | 10/2008 | Kaji et al. |
| 2008/0263401 A1 | 10/2008 | Stenzel |
| 2008/0270578 A1 | 10/2008 | Zhang et al. |
| 2008/0279200 A1 | 11/2008 | Shatzkamer et al. |
| 2008/0281908 A1 | 11/2008 | McCanne et al. |
| 2008/0281944 A1 | 11/2008 | Vorne et al. |
| 2008/0282047 A1 | 11/2008 | Arakawa et al. |
| 2008/0282354 A1 | 11/2008 | Wobber et al. |
| 2008/0288661 A1 | 11/2008 | Galles |
| 2008/0294446 A1 | 11/2008 | Guo et al. |
| 2008/0301760 A1 | 12/2008 | Lim |
| 2008/0316922 A1 | 12/2008 | Riddle et al. |
| 2009/0007162 A1 | 1/2009 | Sheehan |
| 2009/0013138 A1 | 1/2009 | Sudhakar |
| 2009/0019535 A1 | 1/2009 | Mishra et al. |
| 2009/0028337 A1 | 1/2009 | Balabine et al. |
| 2009/0037975 A1 | 2/2009 | Ishikawa et al. |
| 2009/0041230 A1 | 2/2009 | Williams |
| 2009/0049230 A1 | 2/2009 | Pandya |
| 2009/0055507 A1 | 2/2009 | Oeda |
| 2009/0055607 A1 | 2/2009 | Schack et al. |
| 2009/0070617 A1 | 3/2009 | Arimilli et al. |
| 2009/0077097 A1 | 3/2009 | Lacapra et al. |
| 2009/0077619 A1 | 3/2009 | Boyce |
| 2009/0080440 A1 | 3/2009 | Balyan et al. |
| 2009/0089344 A1 | 4/2009 | Brown et al. |
| 2009/0089487 A1 | 4/2009 | Kwon et al. |
| 2009/0094252 A1 | 4/2009 | Wong et al. |
| 2009/0094311 A1 | 4/2009 | Awadallah et al. |
| 2009/0094610 A1 | 4/2009 | Sukirya |
| 2009/0097480 A1 | 4/2009 | Curtis et al. |
| 2009/0106255 A1 | 4/2009 | Lacapra et al. |
| 2009/0106263 A1 | 4/2009 | Khalid et al. |
| 2009/0106413 A1 | 4/2009 | Salo et al. |
| 2009/0119504 A1 | 5/2009 | Van Os et al. |
| 2009/0125496 A1 | 5/2009 | Wexler et al. |
| 2009/0125532 A1 | 5/2009 | Wexler et al. |
| 2009/0125625 A1 | 5/2009 | Shim et al. |
| 2009/0125955 A1 | 5/2009 | DeLorme |
| 2009/0132616 A1 | 5/2009 | Winter et al. |
| 2009/0138314 A1 | 5/2009 | Bruce |
| 2009/0138749 A1 | 5/2009 | Moll et al. |
| 2009/0141891 A1 | 6/2009 | Boyen et al. |
| 2009/0157678 A1 | 6/2009 | Turk |
| 2009/0158068 A1 | 6/2009 | Pudipeddif |
| 2009/0161542 A1 | 6/2009 | Ho |
| 2009/0184585 A1 | 7/2009 | Hartmann |
| 2009/0187915 A1 | 7/2009 | Chew et al. |
| 2009/0193126 A1 | 7/2009 | Agarwal et al. |
| 2009/0193513 A1 | 7/2009 | Agarwal et al. |
| 2009/0196282 A1 | 8/2009 | Fellman et al. |
| 2009/0204649 A1 | 8/2009 | Wong et al. |
| 2009/0204650 A1 | 8/2009 | Wong et al. |
| 2009/0204705 A1 | 8/2009 | Marinov et al. |
| 2009/0210431 A1 | 8/2009 | Marinkovic et al. |
| 2009/0210875 A1 | 8/2009 | Bolles et al. |
| 2009/0217163 A1 | 8/2009 | Jaroker |
| 2009/0217386 A1 | 8/2009 | Schneider |
| 2009/0228956 A1 | 9/2009 | He et al. |
| 2009/0240705 A1 | 9/2009 | Miloushev et al. |
| 2009/0240899 A1 | 9/2009 | Akagawa et al. |
| 2009/0241176 A1 | 9/2009 | Beletski et al. |
| 2009/0248893 A1 | 10/2009 | Richardson et al. |
| 2009/0265396 A1 | 10/2009 | Ram et al. |
| 2009/0265467 A1 | 10/2009 | Peles |
| 2009/0287935 A1 | 11/2009 | Aull et al. |
| 2009/0289828 A1 | 11/2009 | Hinchey |
| 2009/0292957 A1 | 11/2009 | Bower et al. |
| 2009/0296624 A1 | 12/2009 | Ryu et al. |
| 2009/0300161 A1 | 12/2009 | Pruitt et al. |
| 2009/0300407 A1 | 12/2009 | Kamath et al. |
| 2009/0310493 A1 | 12/2009 | Nogami |
| 2009/0313503 A1 | 12/2009 | Atluri et al. |
| 2009/0316708 A1 | 12/2009 | Yahyaoui et al. |
| 2009/0319600 A1 | 12/2009 | Sedan et al. |
| 2010/0011434 A1 | 1/2010 | Kay |
| 2010/0017643 A1 | 1/2010 | Baba et al. |
| 2010/0017846 A1 | 1/2010 | Huang et al. |
| 2010/0023582 A1 | 1/2010 | Pedersen et al. |
| 2010/0030777 A1 | 2/2010 | Panwar et al. |
| 2010/0042743 A1 | 2/2010 | Jeon et al. |
| 2010/0061232 A1 | 3/2010 | Zhou et al. |
| 2010/0064001 A1 | 3/2010 | Daily |
| 2010/0070476 A1 | 3/2010 | O'Keefe et al. |
| 2010/0071048 A1 | 3/2010 | Novak et al. |
| 2010/0077226 A1 | 3/2010 | Senga et al. |
| 2010/0082542 A1 | 4/2010 | Feng et al. |
| 2010/0093318 A1 | 4/2010 | Zhu et al. |

(56) References Cited

U.S. PATENT DOCUMENTS

| | | |
|---|---|---|
| 2010/0115236 A1 | 5/2010 | Bataineh et al. |
| 2010/0122091 A1 | 5/2010 | Huang et al. |
| 2010/0122248 A1 | 5/2010 | Robinson et al. |
| 2010/0131654 A1 | 5/2010 | Malakapalli et al. |
| 2010/0150154 A1 | 6/2010 | Viger et al. |
| 2010/0154031 A1 | 6/2010 | Montemurro et al. |
| 2010/0162014 A1 | 6/2010 | Memon |
| 2010/0165877 A1 | 7/2010 | Shukla et al. |
| 2010/0179984 A1 | 7/2010 | Sebastian |
| 2010/0180349 A1 | 7/2010 | Koohgoli |
| 2010/0188976 A1 | 7/2010 | Rahman et al. |
| 2010/0189052 A1 | 7/2010 | Kavanagh et al. |
| 2010/0199042 A1 | 8/2010 | Bates et al. |
| 2010/0205206 A1 | 8/2010 | Rabines et al. |
| 2010/0211547 A1 | 8/2010 | Kamei et al. |
| 2010/0218019 A1 | 8/2010 | Eckhard |
| 2010/0228814 A1 | 9/2010 | McKenna et al. |
| 2010/0228819 A1 | 9/2010 | Wei |
| 2010/0242092 A1 | 9/2010 | Harris et al. |
| 2010/0250497 A1 | 9/2010 | Redlich et al. |
| 2010/0251330 A1 | 9/2010 | Kroeselberg et al. |
| 2010/0274772 A1 | 10/2010 | Samuels |
| 2010/0278733 A1 | 11/2010 | Karsten et al. |
| 2010/0279733 A1 | 11/2010 | Karsten et al. |
| 2010/0299451 A1 | 11/2010 | Yigang et al. |
| 2010/0306169 A1 | 12/2010 | Pishevar et al. |
| 2010/0318870 A1 | 12/2010 | Utagawa |
| 2010/0322250 A1 | 12/2010 | Shetty et al. |
| 2010/0325257 A1 | 12/2010 | Goel et al. |
| 2010/0325277 A1 | 12/2010 | Muthiah et al. |
| 2010/0325634 A1 | 12/2010 | Ichikawa et al. |
| 2011/0026403 A1 | 2/2011 | Shao |
| 2011/0040889 A1 | 2/2011 | Garrett et al. |
| 2011/0047620 A1 | 2/2011 | Mahaffey et al. |
| 2011/0055921 A1 | 3/2011 | Narayanaswamy et al. |
| 2011/0066718 A1 | 3/2011 | Susai et al. |
| 2011/0066736 A1 | 3/2011 | Mitchell et al. |
| 2011/0072321 A1 | 3/2011 | Dhuse |
| 2011/0075667 A1 | 3/2011 | Li et al. |
| 2011/0078303 A1 | 3/2011 | Li et al. |
| 2011/0083185 A1 | 4/2011 | Sheleheda et al. |
| 2011/0087696 A1 | 4/2011 | Lacapra |
| 2011/0093471 A1 | 4/2011 | Brockway et al. |
| 2011/0098087 A1 | 4/2011 | Tseng |
| 2011/0099135 A1 | 4/2011 | Machulsky |
| 2011/0099146 A1 | 4/2011 | McAlister et al. |
| 2011/0099420 A1 | 4/2011 | McAlister et al. |
| 2011/0107077 A1 | 5/2011 | Henderson et al. |
| 2011/0113095 A1 | 5/2011 | Hatami-Hanza |
| 2011/0119234 A1 | 5/2011 | Schack et al. |
| 2011/0153822 A1 | 6/2011 | Rajan et al. |
| 2011/0154443 A1 | 6/2011 | Thakur et al. |
| 2011/0173295 A1 | 7/2011 | Bakke et al. |
| 2011/0176465 A1 | 7/2011 | Panta |
| 2011/0184733 A1 | 7/2011 | Yu et al. |
| 2011/0185082 A1 | 7/2011 | Thompson |
| 2011/0188415 A1 | 8/2011 | Graziano |
| 2011/0197059 A1 | 8/2011 | Klein et al. |
| 2011/0202676 A1 | 8/2011 | Craig et al. |
| 2011/0213911 A1 | 9/2011 | Eldus et al. |
| 2011/0231652 A1* | 9/2011 | Bollay .............. H04L 63/166 713/153 |
| 2011/0246800 A1 | 10/2011 | Accpadi et al. |
| 2011/0264736 A1 | 10/2011 | Zuckerberg et al. |
| 2011/0273984 A1 | 11/2011 | Hsu et al. |
| 2011/0277016 A1 | 11/2011 | Hockings et al. |
| 2011/0282997 A1 | 11/2011 | Prince et al. |
| 2011/0296411 A1 | 12/2011 | Tang et al. |
| 2011/0314178 A1 | 12/2011 | Kanode et al. |
| 2011/0314518 A1* | 12/2011 | Ding ................. H04L 41/0806 726/4 |
| 2011/0320882 A1 | 12/2011 | Beaty et al. |
| 2011/0321122 A1 | 12/2011 | Mwangi et al. |
| 2012/0014265 A1 | 1/2012 | Schlansker |
| 2012/0016994 A1 | 1/2012 | Nakamura et al. |
| 2012/0030341 A1 | 2/2012 | Jensen et al. |
| 2012/0039341 A1 | 2/2012 | Latif et al. |
| 2012/0041965 A1 | 2/2012 | Vasquez et al. |
| 2012/0042115 A1 | 2/2012 | Young |
| 2012/0042160 A1* | 2/2012 | Nakhjiri .............. H04L 9/0844 713/151 |
| 2012/0063314 A1 | 3/2012 | Pignataro et al. |
| 2012/0066489 A1 | 3/2012 | Ozaki et al. |
| 2012/0078856 A1 | 3/2012 | Linde |
| 2012/0079055 A1 | 3/2012 | Robinson |
| 2012/0101952 A1 | 4/2012 | Raleigh et al. |
| 2012/0117028 A1 | 5/2012 | Gold et al. |
| 2012/0124372 A1 | 5/2012 | Dilley et al. |
| 2012/0144049 A1 | 6/2012 | Lopez Nieto et al. |
| 2012/0144229 A1 | 6/2012 | Nadolski |
| 2012/0150699 A1 | 6/2012 | Trapp et al. |
| 2012/0150805 A1 | 6/2012 | Pafumi et al. |
| 2012/0159249 A1 | 6/2012 | Son et al. |
| 2012/0191847 A1 | 7/2012 | Nas et al. |
| 2012/0195273 A1 | 8/2012 | Iwamura et al. |
| 2012/0198043 A1 | 8/2012 | Hesketh et al. |
| 2012/0198512 A1 | 8/2012 | Jain et al. |
| 2012/0224531 A1 | 9/2012 | Karuturi et al. |
| 2012/0254293 A1 | 10/2012 | Winter et al. |
| 2012/0257506 A1 | 10/2012 | Bazlamacci et al. |
| 2012/0258766 A1 | 10/2012 | Cho et al. |
| 2012/0311153 A1 | 12/2012 | Morgan |
| 2012/0317266 A1 | 12/2012 | Abbott |
| 2013/0007239 A1 | 1/2013 | Agarwal et al. |
| 2013/0028085 A1 | 1/2013 | Bilodeau |
| 2013/0029726 A1 | 1/2013 | Berionne et al. |
| 2013/0031060 A1 | 1/2013 | Lowery et al. |
| 2013/0058229 A1 | 3/2013 | Casado et al. |
| 2013/0058252 A1 | 3/2013 | Casado et al. |
| 2013/0058255 A1 | 3/2013 | Casado et al. |
| 2013/0086237 A1 | 4/2013 | Cutler |
| 2013/0086626 A1 | 4/2013 | Kavantzas |
| 2013/0091002 A1 | 4/2013 | Christie et al. |
| 2013/0117313 A1 | 5/2013 | Miao |
| 2013/0163758 A1 | 6/2013 | Swaminathan et al. |
| 2013/0182713 A1 | 7/2013 | Giacomoni et al. |
| 2013/0198322 A1 | 8/2013 | Oran et al. |
| 2013/0205361 A1 | 8/2013 | Narayanaswamy et al. |
| 2013/0238472 A1 | 9/2013 | Fan et al. |
| 2013/0239166 A1 | 9/2013 | MacLeod |
| 2013/0336122 A1 | 12/2013 | Baruah et al. |
| 2014/0025823 A1 | 1/2014 | Szabo et al. |
| 2014/0040478 A1 | 2/2014 | Hsu et al. |
| 2014/0059678 A1 | 2/2014 | Parker |
| 2014/0071895 A1 | 3/2014 | Bane et al. |
| 2014/0095661 A1 | 4/2014 | Knowles et al. |
| 2014/0099945 A1 | 4/2014 | Singh et al. |
| 2014/0105069 A1 | 4/2014 | Potnuru |
| 2014/0136676 A1 | 5/2014 | Chow et al. |
| 2014/0019605 A1 | 6/2014 | Boberg et al. |
| 2014/0162705 A1 | 6/2014 | de Wit et al. |
| 2014/0171089 A1 | 6/2014 | Janakiraman et al. |
| 2014/0187199 A1 | 7/2014 | Yan et al. |
| 2014/0269484 A1 | 9/2014 | Dankberg et al. |
| 2014/0286316 A1 | 9/2014 | Park et al. |
| 2014/0317404 A1 | 10/2014 | Carlson et al. |
| 2014/0359696 A1 | 12/2014 | Mallia |
| 2015/0058595 A1 | 2/2015 | Gura et al. |
| 2016/0065565 A1* | 3/2016 | Plotnik ................. H04L 63/14 726/10 |

FOREIGN PATENT DOCUMENTS

| | | | |
|---|---|---|---|
| CA | 2512312 | A1 | 7/2004 |
| DE | 4306719 | A1 | 9/1993 |
| DE | 4411448 | A1 | 10/1995 |
| DE | 10055689 | A1 | 5/2002 |
| DE | 10152543 | A1 | 5/2003 |
| DE | 10320343 | A1 | 12/2004 |
| DE | 102004020998 | A1 | 11/2005 |
| DE | 102004041821 | A1 | 3/2006 |
| DE | 102004043515 | A1 | 3/2006 |
| DE | 102004049482 | A1 | 4/2006 |
| DE | 102005003794 | A1 | 8/2006 |

(56) References Cited

FOREIGN PATENT DOCUMENTS

| | | |
|---|---|---|
| DE | 102006010990 A1 | 9/2006 |
| DE | 102005030829 A1 | 1/2007 |
| EP | 0493286 | 7/1992 |
| EP | 0605088 | 2/1996 |
| EP | 0 738 970 A1 | 10/1996 |
| EP | 0744850 A2 | 11/1996 |
| EP | 1081918 | 8/2000 |
| EP | 1544535 A1 | 6/2005 |
| EP | 1662349 A1 | 5/2006 |
| JP | 63010250 A | 1/1988 |
| JP | 6205006 | 7/1994 |
| JP | 06-332782 | 12/1994 |
| JP | 821924 | 3/1996 |
| JP | 08-328760 | 12/1996 |
| JP | 08-339355 | 12/1996 |
| JP | 9016510 A | 1/1997 |
| JP | 11282741 A | 10/1999 |
| JP | 2000183935 | 6/2000 |
| NZ | 566291 A | 12/2008 |
| WO | WO 91/14326 | 9/1991 |
| WO | WO 95/05712 | 2/1995 |
| WO | WO 97/09805 | 3/1997 |
| WO | WO 97/45800 | 12/1997 |
| WO | WO 99/05829 | 2/1999 |
| WO | WO 99/06913 | 2/1999 |
| WO | WO 99/10858 | 3/1999 |
| WO | WO 99/39373 | 8/1999 |
| WO | WO 99/64967 | 12/1999 |
| WO | WO 99/66675 | 12/1999 |
| WO | WO 00/04422 | 1/2000 |
| WO | WO 00/04458 | 1/2000 |
| WO | WO 00/58870 | 3/2000 |
| WO | WO 00/35163 | 6/2000 |
| WO | WO 2002/39696 | 5/2002 |
| WO | WO 02/056181 A2 | 7/2002 |
| WO | WO 2004/061605 A2 | 7/2004 |
| WO | WO 2006/091040 | 8/2006 |
| WO | WO 2007/071032 A1 | 6/2007 |
| WO | WO 2007/085704 A1 | 8/2007 |
| WO | WO 2008/130983 A1 | 10/2008 |
| WO | WO 2008/147973 A2 | 12/2008 |

OTHER PUBLICATIONS

Almesberger Werner, et al., "Application Requested IP over ATM (Arequipa) and its use in the Web," Laboratoire de Reseaux de Communication, pp. 1-9, Swiss Federal Institute of Technology, Lusanne, Switzerland. (1996).

Kühn, S., et al., "Current and Advanced Protocols over ATM: Evaluation, Implementation and Experiences," Dresden University of Technology; Department of Computer Science, pp. 1-13, Dresden, Germany. (1996).

Parulkar G., et al., "altPm: Strategy for Integrating IP with ATM," Department of Computer Science, Washington University, pp. 1-10, St. Louis, MO, USA. (1995).

Vangala, S., et al., "Performance of TCP over Wireless Networks with the Snoop Protocol," Department of Computer Science and Engineering, University of South Florida, pp. 1-2, Tampa, FL. (2002).

"A Process for Selective Routing of Servlet Content to Transcoding Modules," Research Disclosure 422124, IBM Corporation, pp. 889-890, Jun. 1999.

"A Storage Architecture Guide," Second Edition, 2001, Auspex Systems, Inc., www.auspex.com, last accessed on Dec. 30, 2002.

"Application Layer Processing (ALP)," Chapter 9, CN-5000E/5500E, Crescendo Networks, pp. 168-186, 2003-2009.

"Big-IP Controller with Exclusive OneConnect Content Switching Feature Provides a Breakthrough System for Maximizing Server and Network Performance," F5 Networks, Inc. Press Release, May 8, 2001, 2 pages, Las Vegas, Nevada.

"CSA Persistent File System Technology," A White Paper, Jan. 1, 1999, pp. 1-3, http://www.cosoa.com/white_papers/pfs.php, Colorado Software Architecture, Inc.

"Distributed File System: A Logical View of Physical Storage: White Paper," 1999, Microsoft Corp., www.microsoft.com, <http://www.eu.microsoft.com/TechNet/prodtechnol/windows2000serv/maintain/DFSnt95>, pp. 1-26, last accessed on Dec. 20, 2002.

"NERSC Tutorials: I/O on the Cray T3E, 'Chapter 8, Disk Striping'," National Energy Research Scientific Computing Center (NERSC), http://hpcfnersc.gov, last accessed on Dec. 27, 2002, 9 pages.

"Scaling Next Generation Web Infrastructure with Content-Intelligent Switching: White Paper," Apr. 2000, pp. 1-9, Alteon Web Systems, Inc.

"Servlet/Applet/HTML Authentication Process With Single Sign-On," Research Disclosure 429128, IBM Corporation, pp. 163-164, Jan. 2000.

"Shared Cipher Spec Protocol," IBM technical Disclosure Bulletin, Apr. 2000, UK.

"The AFS File System in Distributed Computing Environment," www.transarc.ibm.com/Library/whitepapers/AFS/afsoverview.html, last accessed on Dec. 20, 2002.

"Traffic Surges; Surge Queue; Netscaler Defense," 2005 Citrix Systems, Inc., PowerPoint Presentation, slides 1-12.

"VERITAS SANPoint Foundation Suite(™) and SANPoint Foundation Suite(™) HA: New VERITAS Volume Management and File System Technology for Cluster Environments," Sep. 2001, 26 pages, VERITAS Software Corp.

"Windows Clustering Technologies—An Overview," Nov. 2001, 31 pages, Microsoft Corp., www.microsoft.com, last accessed on Dec. 30, 2002.

"Windows Server 2003 Kerberos Extensions," Microsoft TechNet, 2003 (Updated Jul. 31, 2004), http://technet.microsoft.com/en-us/library/cc738207, Microsoft Corporation.

Abad, C., et al., "An Analysis on the Schemes for Detecting and Preventing ARP Cache Poisoning Attacks", IEEE, Computer Society, 27th International Conference on Distributed Computing Systems Workshops (ICDCSW'07), 2007, pp. 1-8.

Aguilera et al., "Improving recoverability in multi-tier storage systems," International Conference on Dependable Systems and Networks (DSN-2007), Jun. 2007, 10 pages, Edinburgh, Scotland.

Allman M., et al., "Enhancing TCP's Loss Recovery Using Limited Transmit," Network Working Group, Standards Track, Jan. 2001, RFC: 3042, pp. 1-11,(htpp://hjp.at/doc/rfc/rfc3042.html).

Almesberger Werner, et al., "Application Requested IP over ATM (Arequipa) and its use in the Web," Laboratoire de Reseaux de Communication, pp. 1-9, Swiss Federal Institute of Technology, Lusanne, Switzerland, Dec. 8, 2017.

Anderson et al., "Interposed Request Routing for Scalable Network Storage," ACM Transactions on Computer Systems 20(1): (Feb. 2002), pp. 1-24.

Anderson et al., "Serverless Network File System," in the 15th Symposium on Operating Systems Principles, Dec. 1995, 40 pages, Association for Computing Machinery, Inc.

Anonymous, "How DFS Works: Remote File Systems," Distributed File System (DFS) Mar. 2003, 54 pages, Technical Reference retrieved from the Internet on Feb. 13, 2009, URL<http://technetmicrosoft.com/en-us/library/cc782417 (WS.10,printer).aspx>.

Apple, Inc., "Mac OS X Tiger Keynote Intro. Part 2," Jun. 2004, www.youtube.com <http://www.youtube.com/watch?v=zSBJwEmRJbY>, 1 page.

Apple, Inc., "Tiger Developer Overview Series: Working with Spotlight," Nov. 23, 2004, www.apple.com using www.archive.org <http://web.archive.org/web/20041123005335/developer.apple.com/macosx/tiger/spotlight.html>, pp. 1-6.

Australian Examination Report on 2008225072, dated Nov. 17, 2011.

Baer, T., et al., "The elements of Web services" ADTmag.com, Dec. 1, 2002, pp. 1-6, (http://www.adtmag.com).

Basney et al., "Credential Wallets: A Classification of Credential Repositories Highlighting MyProxy," Sep. 19-21, 2003, pp. 1-20, 31st Research Conference on Communication, Information and Internet Policy (TPRC 2003), Arlington, Virginia.

Blue Coat, "Technology Primer: CIFS Protocol Optimization," Blue Coat Systems Inc., 2007, last accessed: Dec. 9, 2013, pp. 1-3, (http://www.bluecoat.com).

(56) References Cited

OTHER PUBLICATIONS

Border J., et al., "PILC: Performance Enhancing Proxies (PEPS)," 46th IETF, Nov. 10, 1999, pp. 1-17.
Border, J., et al., "Performance Enhancing Proxies Intended to Mitigate Link-Related Degradations," PILC—Performance Enhancing Proxies, Jun. 2001, RFC: 3135, pp. 1-45.
Botzum, Keys, "Single Sign on—A Contrarian View," Aug. 6, 2001, pp. 1-8, Open Group Website, http://www.opengroup.org/security/topics.htm.
Cabrera et al., "Swift: A Storage Architecture for Large Objects," In Proceedings of the-Eleventh IEEE Symposium on Mass Storage Systems, Oct. 1991, pp. 123-128.
Cabrera et al., "Swift: Using Distributed Disk Striping to Provide High I/O Data Rates," Fall 1991, pp. 405-436, vol. 4, No. 4, Computing Systems.
Cabrera et al., "Using Data Striping in a Local Area Network," 1992, 22 pages, Technical report No. UCSC-CRL-92-09 of the Computer & Information Sciences Department of University of California at Santa Cruz.
Callaghan et al., "NFS Version 3 Protocol Specifications" (RFC 1813), Jun. 1995, 127 pages, The Internet Engineering Task Force (IETN), www.ietf.org, last accessed on Dec. 30, 2002.
Carns et al., "PVFS: A Parallel File System for Linux Clusters," in Proceedings of the Extreme Linux Track: 4th Annual Linux Showcase and Conference, Oct. 2000, pp. 317-327, Atlanta, Georgia, USENIX Association.
Cavale, M. R., "Introducing Microsoft Cluster Service (MSCS) in the Windows Server 2003", Nov. 2002, 10 pages, Microsoft Corporation.
Cooper, I., et al., "Internet Web Replication and Caching Taxonomy," The Internet Society, Jan. 2001, RFC; 3040, pp. 1-33.
Cooper, I., et al., "Web Proxy Auto-Discovery Protocol," Network Working Group, Nov. 15, 2000, pp. 1-20, Internet Draft.
Davison, B., et al., "A Split Stack Approach to Mobility-Providing Performance-Enhancing Proxies," Lehigh University, Nov. 2002, pp. 1-13, Bethlehem, PA.
Diameter MBLB Support Phase 2: Generic Message Based Load Balancing (GMBLB), last accessed Mar. 29, 2010, pp. 1-10, (http://peterpan.f5net.com/twiki/bin/view/TMOS/TMOSDiameterMBLB).
Dutta D., et al., "An Active Proxy Based Architecture for TCP in Heterogeneous Variable Bandwidth Networks," Proceedings of IEEE Globecome 2001, Nov. 2001, vol. 4, pp. 2316-2320.
Ehsan N., et al., "Evaluation of performance enhancing proxies in internet over satellite," International Journal of Communication Systems, Sep. 17, 2002, 22 pgs.
English Translation of Notification of Reason(s) for Refusal for JP 2002-556371 (Dispatch Date: Jan. 22, 2007).
European Examination Report on 08732021.4, dated Jul. 13, 2011.
European Examination Report on 08732021.4, dated Sep. 3, 2010.
F5 Networks Inc., "3-DNS® Reference Guide, version 4.5", F5 Networks Inc., Sep. 2002, pp. 2-1-2-28, 3-1-3-12, 5-1-5-24, Seattle, Washington.
F5 Networks Inc., "Big-IP® Reference Guide, version 4.5", F5 Networks Inc., Sep. 2002, pp. 11-1-11-32, Seattle, Washington.
F5 Networks Inc., "Case Information Log for 'Issues with BoNY upgrade to 4.3'", as early as Feb. 2008.
F5 Networks Inc., "Configuration Guide for Local Traffic Management," F5 Networks Inc., Jan. 2006, version 9.2.2, 406 pgs.
F5 Networks Inc., "Deploying the BIG-IP LTM for Diameter Traffic Management," F5® Deployment Guide, Publication date Sep. 2010, Version 1.2, pp. 1-19.
F5 Networks Inc., "F5 Diameter RM", Powerpoint document, Jul. 16, 2009, pp. 1-7.
F5 Networks Inc., "F5 WANJet CIFS Acceleration", White Paper, F5 Networks Inc., Mar. 2006, pp. 1-5, Seattle, Washington.
F5 Networks Inc., "Routing Global Internet Users to the Appropriate Data Center and Applications Using F5's 3-DNS Controller", F5 Networks Inc., Aug. 2001, pp. 1-4, Seattle, Washington, (http://www.f5.com/f5producs/3dns/relatedMaterials/UsingF5.html).
F5 Networks Inc., "Using F5's 3-DNS Controller to Provide High Availability Between Two or More Data Centers", F5 Networks Inc., Aug. 2001, pp. 1-4, Seattle, Washington, (http://www.f5.com/f5products/3dns/relatedMaterials/3DNSRouting.html).
F5 Networks, Inc., "BIG-IP Access Policy Management Operations Guide", pp. 1-168, F5 Networks, Inc., published Jul. 2016.
F5 Networks, Inc., "BIG-IP® Acceleration: Implementations", F5 Networks, Inc., Version 11.5, Jan. 27, 2014, pp. 1-172.
F5 Networks, Inc., "BIG-IP® Access Policy Manager® and BIG-IP® Edge Client™ for iOS v2.0.8", Technical Notes, pp. 1-38, version 2.0.8, F5 Networks, Inc., published May 30, 2016.
F5 Networks, Inc., "BIG-IP® Access Policy Manager®: Application Access Guide", version 11.4, pp. 1-26, F5 Networks, Inc., published May 15, 2013.
F5 Networks, Inc., "BIG-IP® Access Policy Manager®: Edge Client® and Application Configuration", version 11.5, pp. 1-66, F5 Networks, Inc., published Jan. 27, 2014.
F5 Networks, Inc., "BIG-IP® Access Policy Manager®: Implementations", version 11.5, pp. 1-78, F5 Networks, Inc., published Jan. 27, 2014.
F5 Networks, Inc., "BIG-IP® Access Policy Manager®: Secure Web Gateway Implementations", version 11.5, pp. 1-100, F5 Networks, Inc., published Feb. 13, 2014.
F5 Networks, Inc., "BIG-IP® Access Policy Manager®: Visual Policy Editor", version 11.5.2, pp. 1-92, F5 Networks, Inc., published Jan. 28, 2015.
F5 Networks, Inc., "BIG-IP® Local Traffic Manager™: Implementations", F5 Networks, Inc., Version 11.5, Jan. 30, 2014, pp. 1-272.
Fajardo V., "Open Diameter Software Architecture," Jun. 25, 2004, pp. 1-6, Version 1.0.7.
Fan et al., "Summary Cache: A Scalable Wide-Area Protocol", Computer Communications Review, Association Machinery, New York, USA, Oct. 1998, pp. 254-265, vol. 28, Web Cache Sharing for Computing No. 4.
Farley, M., "Enterprise Storage Forum," Jan. 2000, 2 pages, Book Review-Building Storage Networks, 2nd Edition, http://www.enterprisestorageforum.com/sans/features/print/0,,10556_1441201.00.html, Enterprise Storage Forum Staff, last accessed Dec. 20, 2002.
Fendick et al., "Analysis of Rate-Based Control Strategy with Delayed Feedback," Oct. 1992, vol. 22, Issue 4, pp. 136-148.
Fielding et al., "Hypertext Transfer Protocol—HTTP/1.1," Network Working Group, RFC: 2068, Jan. 1997, pp. 1-162.
Fielding et al., "Hypertext Transfer Protocol—HTTP/1.1," Network Working Group, RFC: 2616, Jun. 1999, pp. 1-176.
Final Office Action, USPTO, U.S. Appl. No. 10/901,952, dated Apr. 24, 2008.
Floyd et al., "Random Early Detection Gateways for Congestion Avoidance," Aug. 1993, pp. 1-22, IEEE/ACM Transactions on Networking, California.
Gibson et al., "File Server Scaling with Network-Attached Secure Disks," in Proceedings of the ACM International Conference on Measurement and Modeling of Computer Systems (Sigmetrics '97), Association for Computing Machinery, Inc., Jun. 15-18, 1997, 13 pages.
Gibson et al., "NASD Scalable Storage Systems," Jun. 1999, 6 pages, USENIX99, Extreme Linux Workshop, Monterey, California.
Gupta et al., "Algorithms for Packet Classification", Computer Systems Laboratory, Stanford University, CA, Mar./Apr. 2001, pp. 1-29.
Harrison, C., May 19, 2008 response to Communication pursuant to Article 96(2) EPC dated Nov. 9, 2007 in corresponding European patent application No. 02718824.2.
Hartman, J., "The Zebra Striped Network File System," 1994, Ph.D. dissertation submitted in the Graduate Division of the University of California at Berkeley.
Haskin et al., "Tiger Shark File System," 1996, in proceedings of IEEE, Spring COMPCON, Santa Clara, CA, www.research.ibm.com, 6 pages, last accessed on Dec. 30, 2002.
Heinz G., "Priorities in Stream Transmission Control Protocol (SCTP) Multistreaming", Thesis submitted to the Faculty of the University of Delaware, Spring 2003, pp. 1-35.

(56) References Cited

OTHER PUBLICATIONS

Hochmuth, Phil, "F5, CacheFlow pump up content-delivery lines," Network World Fusion, May 4, 2001, 1 page, Las Vegas, Nevada.
Hu, J., Final Office action dated Sep. 21, 2007 for related U.S. Appl. No. 10/336,784.
Hu, J., Office action dated Feb. 6, 2007 for related U.S. Appl. No. 10/336,784.
Hwang et al., "Designing SSI Clusters with Hierarchical Checkpointing and Single 1/0 Space," IEEE Concurrency, Jan.-Mar. 1999, pp. 60-69.
Ilvesmaki M., et al., "On the capabilities of application level traffic measurements to differentiate and classify Internet traffic", Presented in SPIE's International Symposium ITcom, Aug. 19-21, 2001, pp. 1-11, Denver, Colorado.
Information Sciences Institute, "Transmission Control Protocol", Darpa Internet Program, Protocol Specification, Sep. 1981, RFC: 793, pp. 1-92, University of Southern California, Marina del Rey, CA, US.
International Preliminary Report on Patentability and Written Opinion, PCT/US2004/024655, dated Jan. 30, 2006.
International Search Report and Written Opinion for International Patent Application No. PCT/US2013/026615 dated (Jul. 4, 2013).
International Search Report and Written Opinion, for International Patent Application No. PCT/US2011/058469, dated Mar. 10, 2015.
International Search Report for International Application No. PCT/US03/41202, dated Sep. 15, 2005.
International Search Report for International Patent Application No. PCT/US 2008/083117 dated (Jun. 23, 2009).
International Search Report for International Patent Application No. PCT/US2008/060449 dated (Apr. 9, 2008).
International Search Report for International Patent Application No. PCT/US2008/064677 dated (Sep. 6, 2009).
International Search Report for International Patent Application No. PCT /US02/00720, dated Jul. 8, 2004.
International Search Report for PCT/US2004/24655, dated Jun. 21, 2005.
International Search Report for PCT/US2008/051993, dated Oct. 1, 2008.
International Search Report for PCT/US2008/056684, dated Jan. 28, 2009.
International Search Report for PCT/US2008/56528, dated Oct. 10, 2008.
International Search Report for PCT/US99/13805, dated Nov. 19, 1999.
Internet Protocol, "Darpa Internet Program Protocol Specification", (RFC:791), Information Sciences Institute, University of Southern California, Sep. 1981, pp. 1-49.
Ishac et al., "On the Performance Proceedings of TCP Spoofing in Satellite Networks," of IEEE MILCOM, 2001, vol. 1, pp. 700-704.
Jacobson et al., "TCP Extensions for High Performance," RFC 1323, May 1, 1992.
Jing J., et al., "Client-Server Computing in Mobile Environments," ACM Computing Surveys, Jun. 1999, vol. 31, No. 2, pp. 117-157.
Kalampoukas et al., "Improving TCP Throughput over Two-Way Asymmetric Links: Analysis and Solutions," In Prov. of Sigmetrics, Aug. 21, 1997, pp. 78-89.
Karamanolis, C. et al., "An Architecture for Scalable and Manageable File Services," HPL-2001-173, Jul. 26, 2001. pp. 1-114.
Katsurashima, W. et al., "NAS Switch: A Novel CIFS Server Virtualization, Proceedings," 20th IEEE/11th NASA Goddard Conference on Mass Storage Systems and Technologies, 2003 (MSST 2003), Apr. 2003.
Kawamoto, D., "Amazon files for Web services patent", CNET News.com, Jul. 28, 2005, pp. 1-2, (http://news.com).
Keshav S., et al., "Issues and Trends in Router Design," Cornell University, IEEE Communications Magazine, IEEE Service Center, May 1998, vol. 36, No. 5, pp. 144-151, Piscataway, NJ, US.
Kimball, C.E. et al., "Automated Client-Side Integration of Distributed Application Servers," 13th LISA Conf., 1999, pp. 275-282 of the Proceedings.
Klayman, J., Nov. 13, 2008 e-mail to Japanese associate including instructions for response to office action dated May 26, 2008 in corresponding Japanese patent application No. 2002-556371.
Klayman, J., Jul. 18, 2007 e-mail to Japanese associate including instructions for response to office action dated Jan. 22, 2007 in corresponding Japanese patent application No. 2002-556371.
Klayman, J., Response filed by Japanese associate to office action dated Jan. 22, 2007 in corresponding Japanese patent application No. 2002-556371.
Kohl et al., "The Kerberos Network Authentication Service (V5)," RFC 1510, Sep. 1993, 105 pages, http://www.ietf.org/ rfc/rfc1510.txt?number=1510.
Korkuzas, V., Communication pursuant to Article 96(2) EPC dated Sep. 11, 2007 in corresponding European patent application No. 02718824.2-2201, 3 pages.
Kühn, S., et al., "Current and Advanced Protocols over ATM: Evaluation, Implementation and Experiences," Dresden University of Technology; Department of Computer Science, pp. 1-13, Dresden, Germany, Dec. 8, 2017.
LaMonica M., "Infravio spiffs up Web services registry idea", CNET News.com, May 11, 2004, pp. 1-2, (http://www.news.com).
Lelil, S., "Storage Technology News: AutoVirt adds tool to help data migration projects," Feb. 25, 2011, last accessed Mar. 17, 2011, 3 pages, <http://searchstorage.techtarget.com/news/article/0,289142,sid5_gci1527986,00. html>.
Long et al., "Swift/RAID: A distributed RAID System", Computing Systems, Summer 1994, 20 pages, vol. 7.
Mac Vittie, L., "Message-Based Load Balancing: Using F5 solutions to address the challenges of scaling Diameter, RADIUS, and message-oriented protocols", F5 Technical Brief, 2005, pp. 1-9, F5 Networks Inc., Seattle, Washington.
MacVittie, Lori, "Message-Based Load Balancing", Technical Brief, Jan. 2010, p. 1-9, F5 Networks, Inc.
Market Research & Releases, CMPP PoC documentation, last accessed Mar. 29, 2010, (http://mainstreet/sites/PD/Teams/ProdMgmt/MarketResearch/Universal).
Market Research & Releases, Solstice Diameter Requirements, last accessed Mar. 29, 2010, (http://mainstreet/sites/PD/Teams/ProdMgmt/MarketResearch/Unisversal).
Mathis et al., "TCP Selective Acknowledgment Options," RFC 2018, Oct. 1996, (http://www.faqs.org/rfcs/rfc2018.html).
Mitt Kerberos Documentation, "Principal Names and DNS," pp. 1-3 (Jan. 1, 1999).
Modiano E., "Scheduling Algorithms for Message Transmission Over a Satellite Broadcast System," MIT Lincoln Laboratory Advanced Network Group, Nov. 1997, pp. 1-7.
Nichols K., et al., "Definition of the Differentiated Services Field (DS Field) in the IPv4 and IPv6 Headers", (RFC:2474) Network Working Group, Dec. 1998, pp. 1-19, (http://www.ietf. org/rfc/rfc2474.txt).
Noghani et al., "A Novel Approach to Reduce Latency on the Internet: 'Component-Based Download'," Proceedings of the Computing, Las Vegas, NV, Jun. 2000, pp. 1-6 on the Internet: Intl Conf. on Internet.
Non-Final Office Action, USPTO, U.S. Appl. No. 10/696,507, dated Apr. 1, 2008.
Non-Final Office Action, USPTO, U.S. Appl. No. 10/696,507, dated Nov. 14, 2007.
Non-Final Office Action, USPTO, U.S. Appl. No. 10/901,691, dated Mar. 20, 2008.
Non-Final Office Action, USPTO, U.S. Appl. No. 10/901,940, dated Aug. 18, 2009.
Non-Final Office Action, USPTO, U.S. Appl. No. 10/901,940, dated Feb. 20, 2009.
Non-Final Office Action, USPTO, U.S. Appl. No. 10/901,952, dated Sep. 14, 2007.
Non-Final Office Action, USPTO, U.S. Appl. No. 10/902,491, dated Dec. 28, 2007.
Non-Final Office Action, USPTO, U.S. Appl. No. 10/902,493, dated Jan. 7, 2008.
Non-Final Office Action, USPTO, U.S. Appl. No. 10/902,509, dated Mar. 18, 2008.

(56) References Cited

OTHER PUBLICATIONS

Non-Final Office Action, USPTO, U.S. Appl. No. 11/685,183, dated Apr. 26, 2011.
Non-Final Office Action, USPTO, U.S. Appl. No. 11/685,183, dated Dec. 11, 2009.
Non-Final Office Action, USPTO, U.S. Appl. No. 11/685,183, dated Jun. 10, 2010.
Non-Final Office Action, USPTO, U.S. Appl. No. 11/685,183, dated May 26, 2009.
Non-Final Office Action, USPTO, U.S. Appl. No. 11/685,183, dated Nov. 19, 2010.
Non-Final Office Action, USPTO, U.S. Appl. No. 11/685,183, dated Oct. 20, 2011.
Norton et al., "CIFS Protocol Version CIFS-Spec 0.9," 2001, 125 pages, Storage Networking Industry Association (SNIA), www.snia.org, last accessed on Mar. 26, 2001.
Notice of Allowance on U.S. Appl. No. 11/301,825 dated Aug. 15, 2011.
Notice of Allowance on U.S. Appl. No. 12/429,774 dated Feb. 18, 2011.
Novotny et al., "An Online Credential Repository for the Grid: MyProxy," 2001, pp. 1-8.
Office Action, U.S. Appl. No. 10/696,507 dated Apr. 13, 2007.
Office Action, U.S. Appl. No. 10/696,507 dated Nov. 13, 2008.
Office Action, U.S. Appl. No. 10/901,691 dated Feb. 27, 2009.
Office Action, U.S. Appl. No. 10/901,691 dated Oct. 28, 2010.
Office Action, U.S. Appl. No. 10/901,691 dated Sep. 13, 2011.
Office Action, U.S. Appl. No. 10/901,940 dated Aug. 5, 2008.
Office Action, U.S. Appl. No. 10/901,940 dated Jan. 25, 2011.
Office Action, U.S. Appl. No. 10/901,940 dated Jan. 8, 2009.
Office Action, U.S. Appl. No. 10/901,940 dated Jul. 20, 2011.
Office Action, U.S. Appl. No. 10/901,940 dated Sep. 3, 2010.
Office Action, U.S. Appl. No. 10/901,952 dated Mar. 16, 2009.
Office Action, U.S. Appl. No. 10/901,952 dated Oct. 16, 2008.
Office Action, U.S. Appl. No. 10/902,491 dated Jan. 5. 2009.
Office Action, U.S. Appl. No. 10/902,491 dated Jul. 22, 2008.
Office Action, U.S. Appl. No. 10/902,493 dated Aug. 20, 2008.
Office Action, U.S. Appl. No. 10/902,493 dated Jan. 21, 2009.
Office Action, U.S. Appl. No. 10/902,509 dated Aug. 13, 2008.
Office Action, U.S. Appl. No. 10/902,509 dated Nov. 18, 2008.
Office Action, U.S. Appl. No. 11/301,825 dated Aug. 26, 2008.
Office Action, U.S. Appl. No. 11/301,825 dated Feb. 28, 2011.
Office Action, U.S. Appl. No. 11/685,156 dated Oct. 6, 2010.
Office Action, U.S. Appl. No. 11/685,181 dated Dec. 10, 2010.
Office Action, U.S. Appl. No. 11/685,181 dated May 23, 2011.
Office Action, U.S. Appl. No. 11/685,181 dated Sep. 17, 2010.
Office Action, U.S. Appl. No. 12/567,402 dated Jan. 12, 2012.
Office Action, U.S. Appl. No. 12/634,496 dated Mar. 9, 2011.
Office Action, U.S. Appl. No. 12/634,496 dated Oct. 4, 2010.
Ott D., et al., "A Mechanism for TCP-Friendly Transport-level Protocol Coordination", USENIX Annual Technical Conference, Jun. 10, 2002, University of North Carolina at Chapel Hill, pp. 1-12.
OWASP, "Testing for Cross site scripting", OWASP Testing Guide v2, Table of Contents, Feb. 24, 2011, pp. 1-5, (www.owasp.org/index.php/Testing_for_Cross_site_scripting).
Padmanabhan V., et al., "Using Predictive Prefetching to Improve World Wide Web Latency", SIGCOM, Jul. 1, 1996, pp. 1-15.
Parulkar G., et al., "aItPm: Strategy for Integrating IP with ATM," Department of Computer Science, Washington University, pp. 1-10, St. Louis, MO, USA, Dec. 8, 2017.
Pashalidis et al., "A Taxonomy of Single Sign-On Systems," 2003, pp. 1-16, Royal Holloway, University of London, Egham Surray, TW20, 0EX, United Kingdom.
Pashalidis et al., "Impostor: A Single Sign-On System for Use from Untrusted Devices," Global Telecommunications Conference, 2004, GLOBECOM '04, IEEE, Issue Date: Nov. 29-Dec. 3, 2004, 5 pages, Royal Holloway, University of London.
Patterson et al., "A case for redundant arrays of inexpensive disks (RAID)", Chicago, Illinois, Jun. 1-3, 1998, pp. 109-116, in Proceedings of ACM SIGMOD conference on the Management of Data, Association for Computing Machinery, Inc., www.acm.org, last accessed on Dec. 20, 2002.
Pearson, P.K., "Fast Hashing of Variable-Length Text Strings," Comm. of the ACM, Jun. 1990, pp. 677-680, vol. 33, No. 6.
Peterson, M., "Introducing Storage Area Networks," Feb. 1998, 6 pages, InfoStor, www.infostor.com, last accessed on Dec. 20, 2002.
Preslan et al., "Scalability and Failure Recovery in a Linux Cluster File System," in Proceedings of the 4th Annual Linux Showcase & Conference, Atlanta, Georgia, Oct. 10-14, 2000, pp. 169-180 of the Proceedings, www.usenix.org/publications/library/proceedings/als2000/full_papers/preslan/presl, last accessed on Dec. 20, 2002.
Raghavan B., et al., "Cloud Control with Distributed Rate Limiting", SIGCOMM'07, Aug. 27-31, 2007, pp. 1-11, Department of Computer Science and Engineering, University of California, San Diego, CA.
Respond to server depending on TCP::client_port, DevCentral Forums iRules, pp. 1-6, last accessed Mar. 26, 2010, (http://devcentral.f5.com/Default/aspx?tabid=53&forumid=5&tpage=1&v).
Response filed Jul. 6, 2007 to Office action dated Feb. 6, 2007 for related U.S. Appl. No. 10/336,784, 24 pages.
Response filed Mar. 20, 2008 to Final Office action dated Sep. 21, 2007 for related U.S. Appl. No. 10/336,784, 22 pages.
Restriction Requirement for U.S. Appl. No. 12/567,402 dated Oct. 27, 2011.
Rodriguez et al., "Parallel-access for mirror sites in the Internet," InfoCom 2000. Nineteenth Annual Joint Conference of the IEEE Computer and Communications Societies. Proceedings. IEEE Tel Aviv, Israel Mar. 26-30, 2000, Piscataway, NJ, USA, IEEE, US, Mar. 26, 2000 (Mar. 26, 2000), pp. 864-873, XP010376176 ISBN: 0-7803-5880-5 p. 867, col. 2, last paragraph—p. 868, col. 1, paragraph 1.
Rosen E., et al., "MPLS Label Stack Encoding", (RFC:3032) Network Working Group, Jan. 2001, pp. 1-22, (http://www.ietf.org/rfc/rfc3032.txt).
RSYNC, "Welcome to the RSYNC Web Pages," Retrieved from the Internet URL: http://samba.anu.edu.ut.rsync/. (Retrieved on Dec. 18, 2009), 5 pages.
Samaraweera, "Return Link Optimization for Internet Service Provision Using DVB-S Networks," ACM SIGCOMM Computer Communication Review, Jul. 1999, vol. 31, No. 2, pp. 117-157.
Santos J., et al., "Increasing Effective Link Bandwidth by Suppressing Replicated Data," Proceedings of The USENIX Annual Technical Conference (No. 98), Jun. 1998, pp. 213-224.
Savage et al., "AFRAID- A Frequently Redundant Array of Independent Disks," Jan. 22-26, 1996, pp. 1-13, USENIX Technical Conference, San Diego, California.
Schaefer, Ken, "IIS and Kerberos Part 5—Protocol Transition, Constrained Delegation, S4U2S and S402P," Jul. 18, 2007, 21 pages, http://www.adopenstatic.com/cs/blogs/ken/archive/2007/07/19/8460.aspx.
Schilit B., "Bootstrapping Location-Enhanced Web Services", University of Washington, Dec. 4, 2003, (http://www.cs.washington.edu/news/colloq.info.html).
Seeley R., "Can Infravio technology revive UDDI?", ADTmag.com, Oct. 22, 2003, (http://www.adtmag.com).
Shohoud, Y., "Building XML Web Services with VB .Net and VB 6", Addison Wesley, Sep. 2002, pp. 1-14.
Sleeper B., "The Evolution of UDDI", UDDI.org White Paper, The Stencil Group, Inc., Jul. 19, 2002, pp. 1-15, San Francisco, California.
Sleeper B., "Why UDDI Will Succeed, Quietly: Two Factors Push Web Services Forward", The Stencil Group, Inc., Apr. 2001, pp. 1-7, San Francisco, California.
Snoeren A., et al., "Managing Cloud Resources:Distributed Rate Limited", Building and Programming the Cloud Workshop, Jan. 13, 2010, pp. 1-38, UCSDCSE Computer Science and Engineering.
Soltis et al., "The Design and Performance of a Shared Disk File System for IRIX," Mar. 23-26, 1998, pp. 1-17, Sixth NASA Goddard Space Flight Center Conference on Mass Storage and Technologies in cooperation with the Fifteenth IEEE Symposium on Mass Storage Systems, University of Minnesota.

(56) References Cited

OTHER PUBLICATIONS

Soltis et al., "The Global File System," Sep. 17-19, 1996, 24 pages, in Proceedings of the Fifth NASA Goddard Space Flight Center Conference on Mass Storage Systems and Technologies, College Park, Maryland.
Sommers F., "Whats New in UDDI 3.0—Part 1", Web Services Papers, Jan. 27, 2003, pp. 1-4, (http://www.webservices.org/index.php/article/articleprint/871/-1/24/).
Sommers F., "Whats New in UDDI 3.0—Part 2", Web Services Papers, Mar. 2, 2003, pp. 1-8, (http://www.web.archive.org/web/20040620131006/).
Sommers F., "Whats New in UDDI 3.0—Part 3", Web Services Papers, Sep. 2, 2003, pp. 1-4, (http://www.webservices.org/index.php/article/articleprint/894/-1/24/).
Sorenson, K.M., "Installation and Administration: Kimberlite Cluster Version 1.1.0, Rev. Dec. 2000," 137 pages, Mission Critical Linux, http://oss.missioncriticallinux.com/kimberlite/kimberlite.pdf.
Spatcheck, O., et al., "Optimizing TCP Forwarder Performance," IEEE/ACM Transactions on Networking, Apr. 1, 2000, pp. 1-13.
Spring N., et al., "A Protocol-Independent Technique for Eliminating Redundant Network Traffic," Proceedings of SIGCOMM 2000, Aug. 2000.
Stakutis, C., "Benefits of SAN-based file system sharing," Jul. 2000, pp. 1-4, InfoStor, www.infostor.com, last accessed on Dec. 30, 2002, Penn Well Corporation.
Thekkath et al., "Frangipani: A Scalable Distributed File System," in Proceedings of the 16th ACM Symposium on Operating Systems Principles, Oct. 1997, pp. 1-14, Association for Computing Machinery, Inc.
Tulloch, Mitch, "Microsoft Encyclopedia of Security," 2003, pp. 218, 300-301, Microsoft Press, Redmond, Washington.
UDDI Overview, Sep. 6, 2000, pp. 1-21, uddi.org, (http://www.uddi.org/).
UDDI Technical White Paper, Sep. 6, 2000, pp. 1-12, uddi-org, (http://www.uddi.org/).
UDDI Version 3.0.1, UDDI Spec Technical Committee Specification, Oct. 14, 2003, pp. 1-383, uddi.org, (http://www.uddi.org/).
Uesugi, H., Nov. 26, 2008 amendment filed by Japanese associate in response to office action dated May 26, 2008 in corresponding Japanese patent application No. 2002-556371, 5 pages.
Uesugi, H., English translation of office action dated May 26, 2008 in corresponding Japanese patent application No. 2002-556371, 2 pages.
Uesugi, H., Jul. 15, 2008 letter from Japanese associate reporting office action dated May 26, 2008 in corresponding Japanese patent application No. 2002-556371, 2 pages.
Vangala, S., et al., "Performance of TCP over Wireless Networks with the Snoop Protocol," Department of Computer Science and Engineering, University of South Florida, pp. 1-2, Tampa, FL, Dec. 8, 2017.
Wang B., "Priority and realtime data transfer over the best-effort Internet", Dissertation Abstract,ScholarWorks@UMASS, Sep. 2005, pp. i-xiv and pp. 1-9.
Wikipedia, "Diameter (protocol)", pp. 1-11, last accessed Oct. 27, 2010, (http://en.wikipedia.org/wiki/Diameter_(protocol)).
Wilkes, J., et al., "The HP AutoRAID Hierarchical Storage System," Feb. 1996, 29 pages, vol. 14, No. 1, ACM Transactions on Computer Systems.
Williams et al., The Ultimate Windows Server 2003 System Administrator's Guide: Forwarding Authentication, 2003, 2 pages, Figure 10.7, Addison-Wesley Professional, Boston, Massachusetts.
Woo T.Y.C., "A Modular Approach to Packet Classification: Algorithms and Results", Nineteenth Annual Conference of the IEEE Computer and Communications Societies 3(3):1213-22, Mar. 26-30, 2000, abstract only, (http://ieeexplore.ieee.org/xpl/freeabs_all.jsp?arnumber=832499).
Written Opinion for PCT/US2004/24655 dated Jun. 21, 2005.
Written Opinion for PCT/US2008/051993 dated Oct. 1, 2008.
Written Opinion for PCT/US2008/56528 dated Oct. 10, 2008.
Yamanegi, K., et al., "Implementation Experiments of the TCP Proxy Mechanism," Nov. 9, 2005.
Zayas, E., "AFS-3 Programmer's Reference: Architectural Overview," Sep. 2, 1991, 37 pages, Version 1.0 (doc. number FS-00-D160) Transarc Corporation.
Zhu et al., "Generating KDC Referrals to Locate KERBEROS Realms," pp. 1-17 (Oct. 25, 2004).

\* cited by examiner

US 10,834,065 B1

METHODS FOR SSL PROTECTED NTLM RE-AUTHENTICATION AND DEVICES THEREOF

This application claims the benefit of U.S. Provisional Patent Application Ser. No. 62/140,986, filed Mar. 31, 2015, which is hereby incorporated by reference in its entirety.

FIELD

This technology generally relates to methods and devices for network traffic management and, more particularly, to methods for SSL protected NTLM re-authentication and devices thereof.

BACKGROUND

NTLM is a connection-oriented authentication protocol which uses challenge-response messages to authenticate a client connection. When a client sends a HTTP request to a backend resource that's NTLM protected, the request is allowed if the associated connection is NTLM authenticated. If the connection is not authenticated, then the server responds with an HTTP 401 message to the client to start NTLM handshake.

NTLM handshake involves Negotiate (Type 1), Challenge (Type 2) and Authenticate (Type 3) messages. First, the client starts the handshake by sending the Negotiate (Type 1) message advertising its capabilities. Next, the server responds with a challenge in the Challenge (Type 2) message. Finally, the client generates a response to the challenge and sends it in the Authenticate (Type 3) message. The server authenticates the Authenticate message by sending the challenge (generated by the server as part of the Challenge message) and the response to the challenge (generated by the client) to the Active Directory server. Once the Authenticate message is successfully validated, the client connection is authenticated and the original HTTP request is allowed to access the protected web application.

With prior technologies, when a client computing device receives a connection reset from the server due to any internal or backend server error, then some client computing devices create a new connection and reuse the previously used Authenticate handshake message to authenticate the new connection. However, NTLM is a connection oriented protocol and therefore the servers expect client computing devices to perform full NTLM handshake instead of reusing the previously used Authenticate message so they force client computing devices to restart NTLM negotiation by sending HTTP 401 message. Unfortunately, with prior technologies client computing devices treat these messages like an authenticate failure message resulting in a bad end-user experience.

SUMMARY

A method for SSL protected NTLM re-authentication includes receiving by a network traffic management apparatus a connection reset message from a web application server. The received connection reset message is forwarded by the network traffic management apparatus to the client computing device. A recent request including connection data to access a web application is received by the network traffic management apparatus on a new connection as a response to the forwarded connection reset message from the client computing device. Next, it is determined by the network traffic management apparatus whether the received recent request to access the web application including the connection data is identical to a stored connection data. The client computing device is re-authenticated and granted access by the network traffic management apparatus to the requested web application to when the connection data is determined to be identical to the stored connection data.

A non-transitory computer readable medium having stored thereon instructions for SSL protected NTLM re-authentication comprising machine executable code which when executed by at least one processor, causes the processor to perform steps includes receiving a connection reset message from a web application server. The received connection reset message is forwarded to the client computing device. A recent request including connection data to access a web application is received on a new connection as a response to the forwarded connection reset message from the client computing device. Next, it is determined whether the received recent request to access the web application including the connection data is identical to a stored connection data. The client computing device is re-authenticated and granted access to the requested web application to when the connection data is determined to be identical to the stored connection data.

A network traffic management apparatus including at least one of configurable hardware logic configured to be capable of implementing or a processor coupled to a memory and configured to execute programmed instructions stored in the memory to receiving a connection reset message from a web application server. The received connection reset message is forwarded to the client computing device. A recent request including connection data to access a web application is received on a new connection as a response to the forwarded connection reset message from the client computing device. Next, it is determined whether the received recent request to access the web application including the connection data is identical to a stored connection data. The client computing device is re-authenticated and granted access to the requested web application to when the connection data is determined to be identical to the stored connection data.

This technology provides a number of advantages including providing a method, non-transitory computer readable medium and apparatus that effectively assists with SSL protected NTLM re-authentication. The technology disclosed herein provides advantages of avoiding the requirement of full NTLM authentication when a connection reset message is received from a web application server thereby resulting in better user experience.

DETAILED DESCRIPTION

Figure 1:
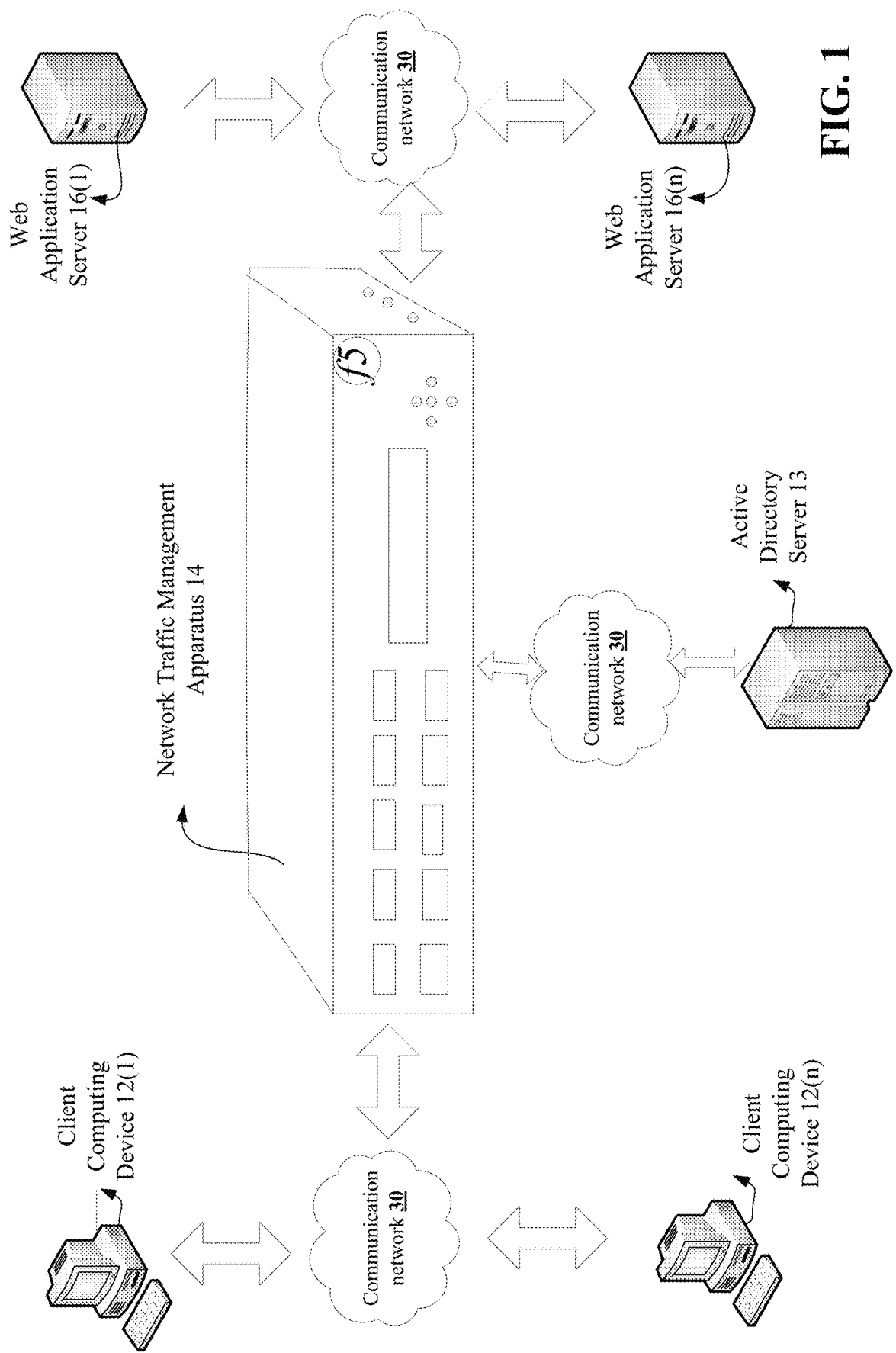
FIG. 1 is an example of a block diagram of an environment including a network traffic management apparatus for SSL protected NTLM re-authentication.
Figure 2:
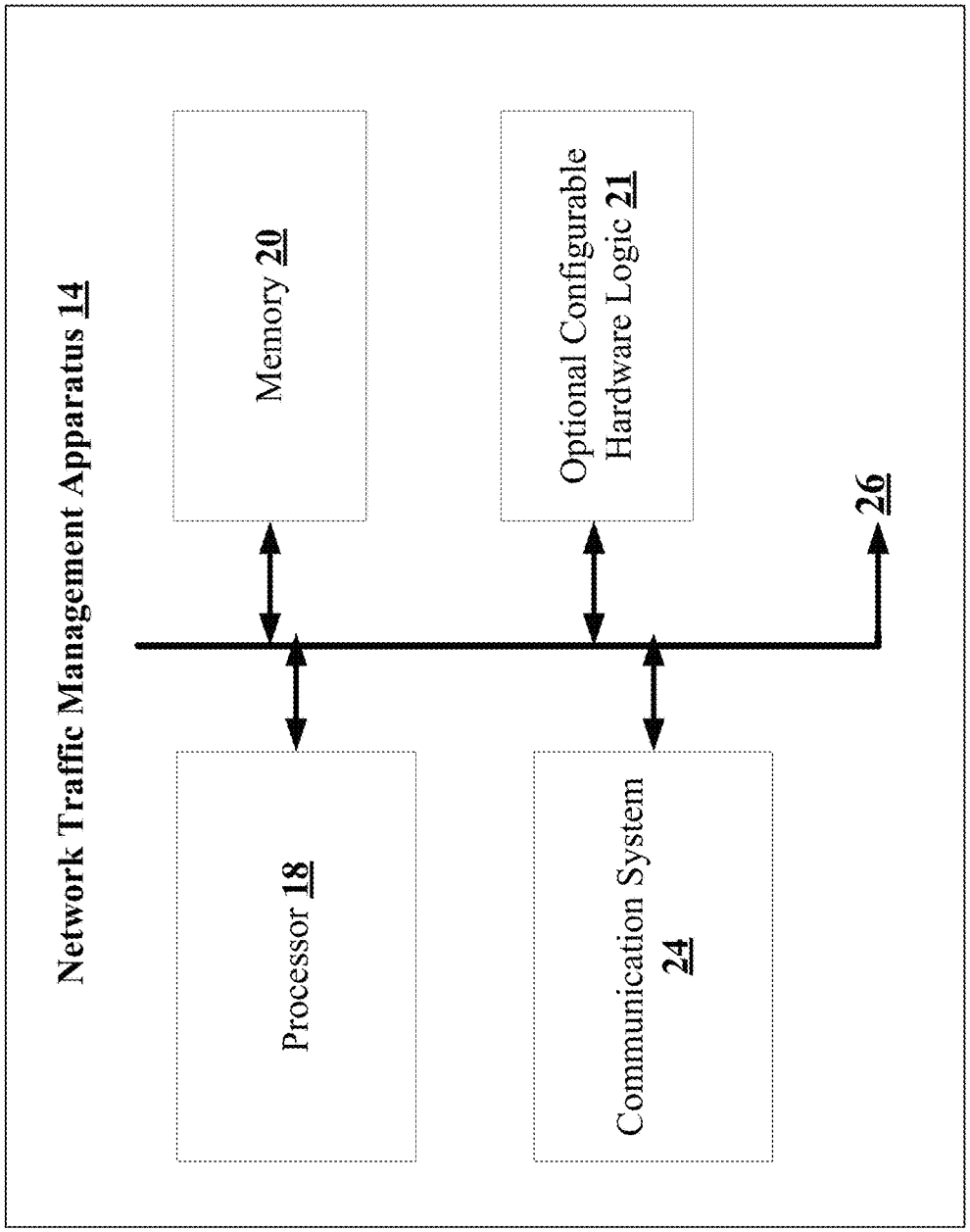
FIG. 2 is an example of a block diagram of a network traffic management apparatus.

An example of a network environment 10 for SSL protected NTLM re-authentication with a network traffic management apparatus 14 is illustrated in FIGS. 1 and 2. The exemplary environment 10 includes a plurality of client computing devices 12(1)-12(n), an active directory server 13, network traffic management apparatus 14, and a plurality of servers 16(1)-16(n) which are coupled together by communication networks 30, although the environment can include other types and numbers of systems, devices, components, and/or elements and in other topologies and deployments. While not shown, the exemplary environment 10 may include additional network components, such as routers, switches and other devices, which are well known to those of ordinary skill in the art and thus will not be described here. This technology provides a number of advantages including providing SSL protected NTLM re-authentication.

Referring more specifically to FIGS. 1 and 2, network traffic management apparatus 14 is coupled to the plurality of client computing devices 12(1)-12(n) and the active directory server 13 through the communication network 30, although the plurality of client computing devices 12(1)-12(n), the active directory server 13, and network traffic management apparatus 14 may be coupled together via other topologies. Additionally, network traffic management apparatus 14 is coupled to the plurality of servers 16(1)-16(n) through the communication network 30, although the plurality of servers 16(1)-16(n) and network traffic management apparatus 14 may be coupled together via other topologies.

The network traffic management apparatus 14 assists with providing SSL protected NTLM re-authentication as illustrated and described by way of the examples herein, although network traffic management apparatus 14 may perform other types and/or numbers of functions. As illustrated in FIG. 2, the network traffic management apparatus 14 may include a processor or central processing unit (CPU) 18, a memory 20, optional configurable hardware logic 21, and a communication system 24 which are coupled together by a bus 26, although the network traffic management apparatus 14 may comprise other types and numbers of elements in other configurations. In this example, the bus 26 is a PCI Express bus in this example, although other bus types and links may be used.

The processor 18 within the network traffic management apparatus 14 may execute one or more computer-executable instructions stored in the memory 20 for the methods illustrated and described with reference to the examples herein, although the processor can execute other types and numbers of instructions and perform other types and numbers of operations. The processor 18 may comprise one or more central processing units ("CPUs") or general purpose processors with one or more processing cores, such as AMD® processor(s), although other types of processor(s) could be used (e.g., Intel®).

Figure 3:
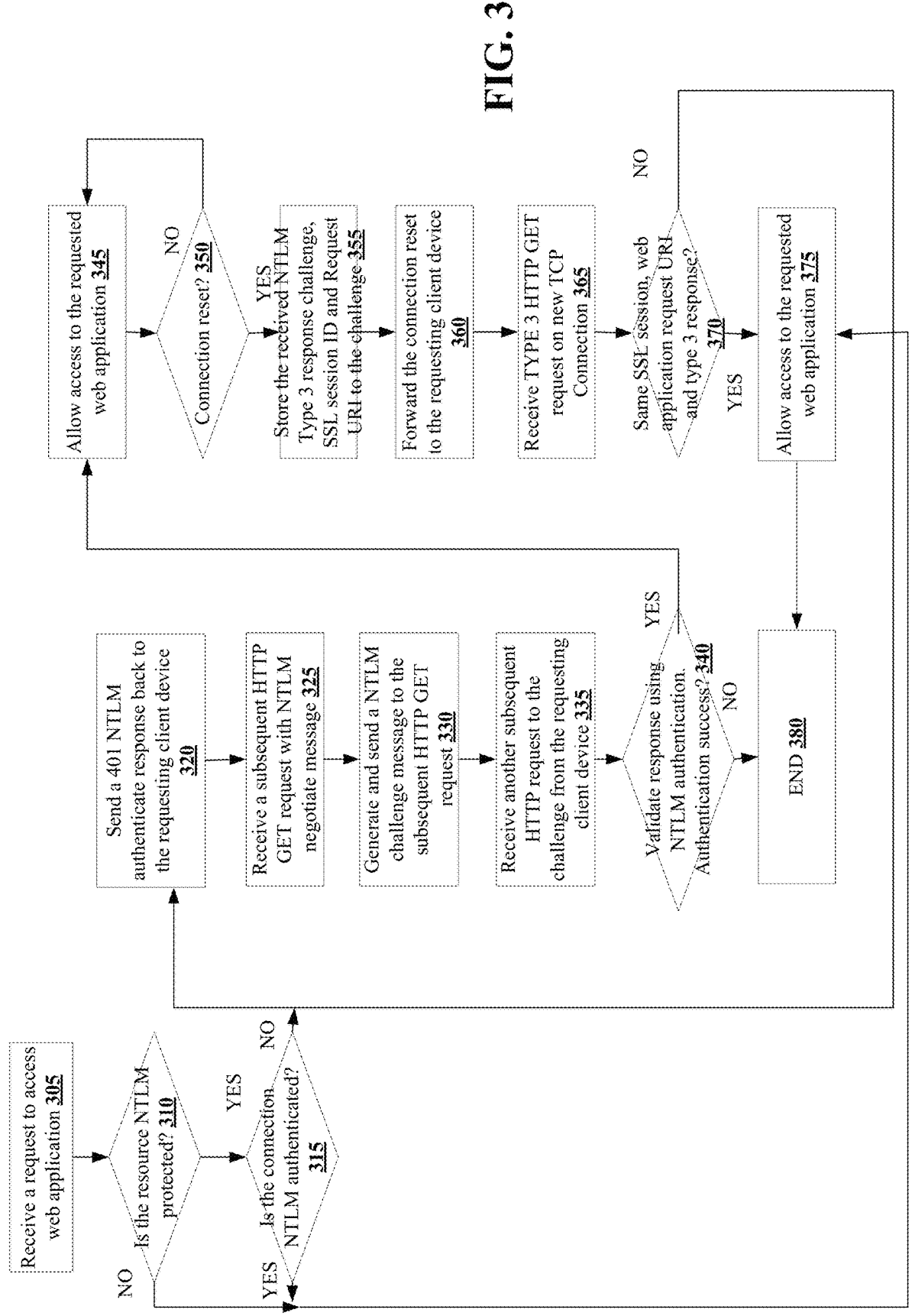
FIG. 3 is an exemplary flowchart of a method for SSL protected NTLM re-authentication.
Figure 4:
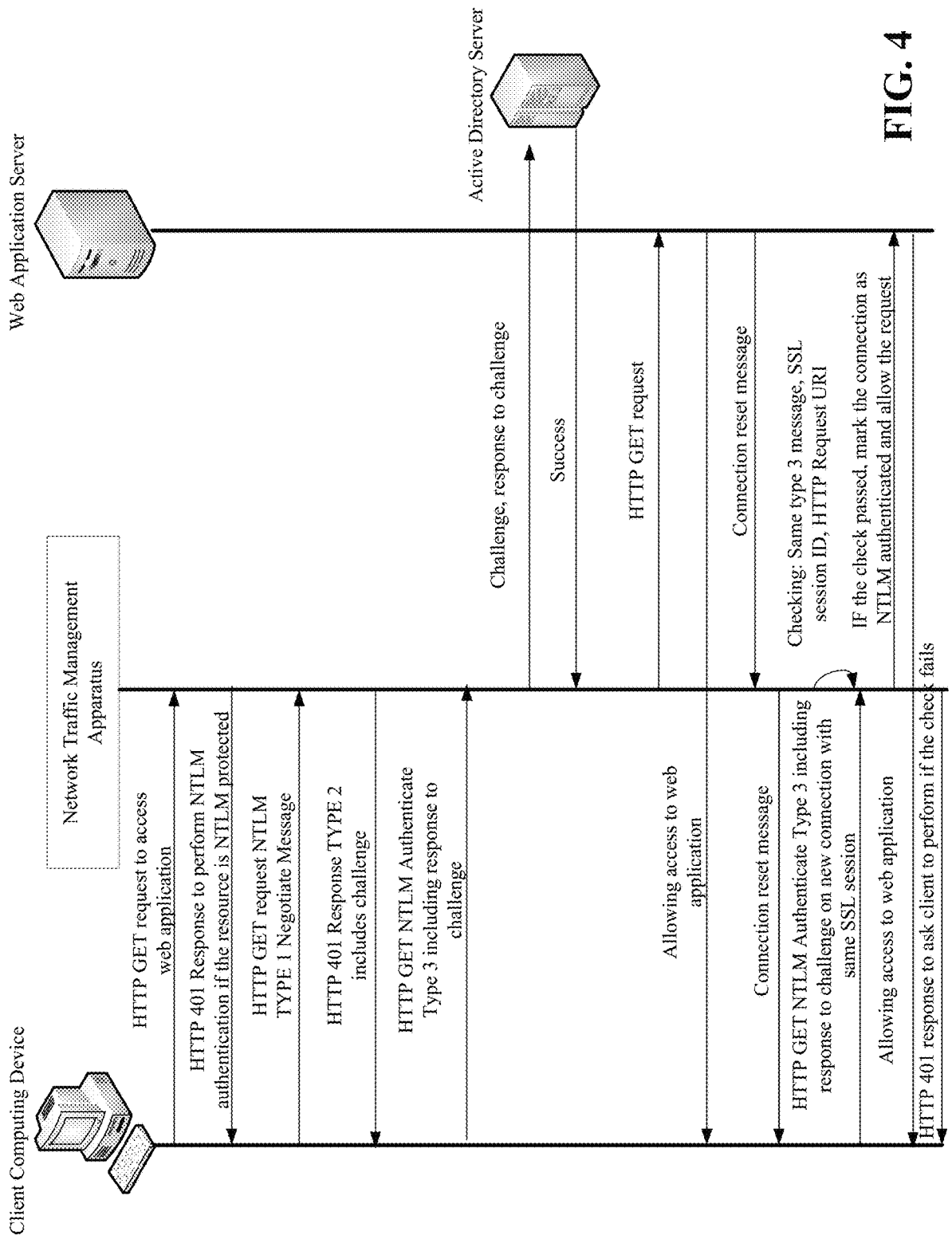
FIG. 4 is an exemplary sequence diagram for SSL protected NTLM re-authentication.

Memory 20 within the network traffic management apparatus 14 may comprise one or more tangible storage media, such as RAM, ROM, flash memory, CD-ROM, floppy disk, hard disk drive(s), solid state memory, DVD, or any other memory storage types or devices, including combinations thereof, which are known to those of ordinary skill in the art. The memory 20 may store one or more non-transitory computer-readable instructions of this technology as illustrated and described with reference to the examples herein that may be executed by the processor 18. The exemplary flowchart shown in FIG. 3 is representative of example steps or actions of this technology that may be embodied or expressed as one or more non-transitory computer or machine readable instructions stored in memory 20 that may be executed by the processor 18 and/or may be implemented by configured logic in the optional configurable logic 21.

Accordingly, the memory of the network traffic management apparatus 14 can store one or more applications that can include computer executable instructions that, when executed by the network traffic management apparatus 14, causes the network traffic management apparatus 14 to perform actions, such as to transmit, receive, or otherwise process messages, for example, and to perform other actions described and illustrated below with reference to FIG. 3. The application(s) can be implemented as module or components of another application. Further, the application(s) can be implemented as operating system extensions, module, plugins, or the like. The application(s) can be implemented as module or components of another application. Further, the application(s) can be implemented as operating system extensions, module, plugins, or the like. Even further, the application(s) may be operative in a cloud-based computing environment. The application(s) can be executed within virtual machine(s) or virtual server(s) that may be managed in a cloud-based computing environment. Also, the application(s), including the network traffic management apparatus 14 itself, may be located in virtual server(s) running in a cloud-based computing environment rather than being tied to one or more specific physical network computing devices. Also, the application(s) may be running in one or more virtual machines (VMs) executing on the network traffic management apparatus 14. Additionally, in at least one of the various embodiments, virtual machine(s) running on the mobile application manager apparatus may be managed or supervised by a hypervisor.

The optional configurable hardware logic 21 in the network traffic management apparatus 14 may comprise specialized hardware configured to implement one or more steps of this technology as illustrated and described with reference to the examples herein. By way of example only, the optional configurable logic hardware device 21 may comprise one or more of field programmable gate arrays ("FPGAs"), field programmable logic devices ("FPLDs"), application specific integrated circuits (ASICs") and/or programmable logic units ("PLUs").

The communication system 24 in the network traffic management apparatus 14 is used to operatively couple and communicate between the network traffic management apparatus 14, the plurality of client computing devices 12(1)-12(n), the active directory server 13, and the plurality of servers 16(1)-16(n) which are all coupled together by communication network 30 such as one or more local area networks (LAN) and/or the wide area network (WAN), although other types and numbers of communication networks or systems with other types and numbers of connections and configurations to other devices and elements. By way of example only, the communication network such as local area networks (LAN) and the wide area network (WAN) can use TCP/IP over Ethernet and industry-standard protocols, including NFS, CIFS, SOAP, XML, LDAP, and SNMP, although other types and numbers of communication networks, can be used. In this example, the bus 26 is a PCI Express bus in this example, although other bus types and links may be used.

Each of the plurality of client computing devices 12(1)-12(n), include a central processing unit (CPU) or processor, a memory, input/display device interface, configurable logic device and an input/output system or I/O system, which are coupled together by a bus or other link. The plurality of client computing devices 12(1)-12(n), in this example, may run interface applications, such as Web browsers, that may provide an interface to make requests for and send and/or receive data to and/or from the plurality of servers 16(1)-16(n) via the network traffic management apparatus 14. Additionally, the plurality of client computing devices 12(1)-12(n) can include any type of computing device that can receive, render, and facilitate user interaction, such as client computers, network computer, mobile computers, virtual machines (including cloud-based computer), or the like. Each of the plurality of client computing devices 12(1)-12(n) utilizes the network traffic management apparatus 14 to conduct one or more operations with the plurality of servers 16(1)-16(n), such as to obtain data from one of the plurality of servers 16(1)-16(n), by way of example only, although other numbers and/or types of systems could be utilizing these resources and other types and numbers of functions utilizing other types of protocols could be performed.

In this example the active directory server 13 include a central processing unit (CPU) or processor, a memory, and a communication system, which are coupled together by a bus or other link, although other numbers and/or types of network devices could be used. In this example, the active directory server 13 assists the network traffic management apparatus 14 with SSL protected NTLM re-authentication, although the active directory server 13 can perform other types or amounts of functions.

Each of the plurality of servers 16(1)-16(n) include a central processing unit (CPU) or processor, a memory, and a communication system, which are coupled together by a bus or other link, although other numbers and/or types of network devices could be used. Generally, the plurality of servers 16(1)-16(n) process requests for providing access to one or more enterprise web applications received from the plurality of client computing devices 12(1)-12(n), network traffic management apparatus 14, or the network traffic management apparatus 14 via the communication network 30 according to the HTTP-based application RFC protocol or the CIFS or NFS protocol in this example, but the principles discussed herein are not limited to this example and can include other application protocols. A series of applications may run on the plurality servers 16(1)-16(n) that allows the transmission of applications requested by the plurality of client computing devices 12(1)-12(n), or the network traffic management apparatus 14. The plurality of servers 16(1)-16(n) may provide data or receive data in response to requests directed toward the respective applications on the plurality of servers 16(1)-16(n) from the plurality of client computing devices 12(1)-12(n) or the network traffic management apparatus 14. It is to be understood that the plurality of servers 16(1)-16(n) may be hardware or software or may represent a system with multiple external resource servers, which may include internal or external networks. In this example the plurality of servers 16(1)-16 (n) may be any version of Microsoft® IIS servers or Apache® servers, although other types of servers may be used.

Although the plurality of servers 16(1)-16(n) are illustrated as single web application servers, one or more actions of each of the servers 16(1)-16(n) may be distributed across one or more distinct network computing devices. Moreover, the servers 16(1)-16(n) are not limited to a particular configuration. Thus, the plurality servers 16(1)-16(n) may contain a plurality of network computing devices that operate using a master/slave approach, whereby one of the network computing devices of the servers 16(1)-16(n) operate to manage and/or otherwise coordinate operations of the other network computing devices. The plurality of servers 16(1)-16(n) may operate as a plurality of network computing devices within cluster architecture, a peer-to peer architecture, virtual machines, or within a cloud architecture.

Thus, the technology disclosed herein is not to be construed as being limited to a single environment and other configurations and architectures are also envisaged. For example, one or more of the servers 16(1)-16(n) depicted in FIG. 1 can operate within network traffic management apparatus 14 rather than as a stand-alone server communicating with network traffic management apparatus 14 via the communication network(s) 30. In this example the servers 16(1)-16(n) operate within the memory of the mobile application manager apparatus.

While network traffic management apparatus 14 is illustrated in this example as including a single device, network traffic management apparatus 14 in other examples can include a plurality of devices or blades each with one or more processors each processor with one or more processing cores that implement one or more steps of this technology. In these examples, one or more of the devices can have a dedicated communication interface or memory. Alternatively, one or more of the devices can utilize the memory, communication interface, or other hardware or software components of one or more other communicably coupled of the devices. Additionally, one or more of the devices that together comprise network traffic management apparatus 14 in other examples can be standalone devices or integrated with one or more other devices or applications, such as one of the plurality of servers 16(1)-16(n) or, active directory server 13, or a network traffic management apparatus 14, or applications coupled to the communication network(s), for example. Moreover, one or more of the devices of network traffic management apparatus 14 in these examples can be in a same or a different communication network 30 including one or more public, private, or cloud networks, for example.

Although an exemplary environment 10 with the plurality of client computing devices 12(1)-12(n), active directory server 13, the network traffic management apparatus 14, and the plurality of servers 16(1)-16(n), communication networks 30 are described and illustrated herein, other types and numbers of systems, devices, blades, components, and elements in other topologies can be used. It is to be understood that the systems of the examples described herein are for exemplary purposes, as many variations of the specific hardware and software used to implement the examples are possible, as will be appreciated by those skilled in the relevant art(s).

Further, each of the systems of the examples may be conveniently implemented using one or more general purpose computer systems, microprocessors, digital signal processors, and micro-controllers, programmed according to the teachings of the examples, as described and illustrated herein, and as will be appreciated by those of ordinary skill in the art.

One or more of the components depicted in the network, such as network traffic management apparatus 14, plurality of client computing devices 12(1)-12(n), active directory server 13, or plurality of servers 16(1)-16(n), for example, may be configured to operate as virtual instances on the same physical machine. In other words, one or more of network traffic management apparatus 14, plurality of client computing devices 12(1)-12(n), or plurality of servers 16(1)-16(n) illustrated in FIG. 1 may operate on the same physical device rather than as separate devices communicating through a network as depicted in FIG. 1. There may be more or fewer plurality of client computing devices 12(1)-12(n), active directory server 13, network traffic management apparatus 14, or plurality of servers 16(1)-16(n) than depicted in FIG. 1. The plurality of client computing devices 12(1)-12(n) or the active directory server 13 could be implemented as applications on network traffic management apparatus 14.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Network (PSTNs), Packet Data Networks (PDNs), the Internet, intranets, and combinations thereof.

The examples may also be embodied as a non-transitory computer readable medium having instructions stored thereon for one or more aspects of the technology as described and illustrated by way of the examples herein, which when executed by a processor (or configurable hardware), cause the processor to carry out the steps necessary to implement the methods of the examples, as described and illustrated herein.

An example of a method for improving web scanner accuracy will now be described with reference to FIGS. 1-4. The exemplary method begins at step 305 with the network traffic management apparatus 14 receiving a HTTP request to access a web application in one of the plurality of web application servers 16(1)-16(n) from one of the plurality of client computing devices 12(1)-12(n), although the network traffic management apparatus 14 can receive other types or amounts of requests from other devices. In this example, the network traffic management apparatus 14 receives the request to access the web application upon establishing a TCP/IP connection with the requesting one of the plurality of client computing devices 12(1)-12(n). Additionally in this example, a secured socket layer (SSL) session is also established with the requesting one of the plurality of client computing devices 12(1)-12(n). Further in this example, the network traffic management apparatus 14 enforces the NTLM authentication on the requesting one of the plurality of client computing devices 12(1)-12(n) to access requested web application, although the network traffic management apparatus 14 may not require the NTLM authentication for other types of web application requests.

Next in step 310, the network traffic management apparatus 14 determines when the requested web application is NTLM protected. In this example, the network traffic management apparatus 14 determines that the requested web application or resource is NTLM protected based on the type of web application or resource being requested, although the network traffic management apparatus 14 can use other techniques to make the determination. Accordingly, when the network traffic management apparatus 14 determines that the requested web application is not NTLM protected, then the No branch is taken to step 375 to allow the requesting one of the plurality of client computing devices 12(1)-12(n) access to the requested web application or resource.

However in step 310, when the network traffic management apparatus 14 determines that the requested resource or web application is NTLM protected, then the Yes branch is taken to step 315.

In step 315, the network traffic management apparatus 14 determines when the connection established with the requesting one of the plurality of client computing devices 12(1)-12(n) is NTLM authenticated. When the network traffic management apparatus 14 determines that the connection between the requesting one of the plurality of client computing devices 12(1)-12(n) is NTLM authenticated, then the Yes branch is taken to step 375 where the network traffic management apparatus 14 allows the requesting one of the plurality of client computing devices 12(1)-12(n) access to the requested web application or resource.

However back in step 315, when the network traffic management apparatus 14 determines that the connection between the requesting one of the plurality of client computing devices 12(1)-12(n) is not NTLM authenticated, then the No branch is taken to step 320.

Next in step 320, the network traffic management apparatus 14 sends a HTTP 401 response back to the requesting one of the plurality of client computing devices 12(1)-12(n) responsive to the requested HTTP request to authenticate the with NTLM, although the network traffic management apparatus 14 can request other types of authentication from the requesting one of the plurality of client computing devices 12(1)-12(n). In this example, the network traffic management apparatus 14 sends a HTTP 401 response back to the requesting one of the plurality of client computing devices 12(1)-12(n) because the requesting one of the plurality of client computing devices 12(1)-12(n) does not use a NTLM-authenticated connection and the requested application requires a NTLM authentication.

Next in step 325, the network traffic management apparatus 14 receives a subsequent HTTP GET request to access the web application in the plurality of web application servers 16(1)-16(n) with the Type 1 NTLM negotiate message in the authorization header, although the network traffic management apparatus 14 can receive other types or amounts of information in the subsequent HTTP GET request. By way of example only, Type 1 NTLM negotiate message includes the capabilities of the requesting one of the plurality of client computing devices 12(1)-12(n), although the Type 1 NTLM negotiate message can include other types or amounts of information.

Next in step 330, network traffic management apparatus 14 generates a challenge and sends the generated challenge in a HTTP 401 response back to the requesting one of the plurality of client computing devices 12(1)-12(n). In this example, the network traffic management apparatus 14 includes the TYPE 2 challenge in the header of the HTTP 401 response.

In step 335, the network traffic management apparatus 14 receives another subsequent HTTP GET request to access the web application from the requesting one of the plurality of client computing devices 12(1)-12(n) including a TYPE 3 NTLM authenticate message in the header. By way of example only, the TYPE 3 NTLM authenticate message includes a response to the challenge that was previously sent by the network traffic management apparatus 14, although the TYPE 3 NTLM authenticate message can include other types or amounts of information such as domain name, user name, or server target name.

Next in step 340, the network traffic management apparatus 14 determines when the received response to the challenge is correct by sending the generated challenge and the response received for the challenge from the requesting one of the plurality of client computing devices 12(1)-12(n) to the active directory server 13 and receiving a response back from the active directory server 13. In this example, the active directory server 13 compares the received challenge and the response to the challenge and validates using the user's password stored within the active directory server 13. When the active directory server 13 determines that the received response to the challenge is correct based on the stored information, the active directory sends the network traffic management apparatus 14 a response indicating that the challenge and the response to the challenge is a success. However, if the active directory server 13 determines that the received response to the challenge is incorrect, then the active directory server 13 sends a failure message back to the network traffic management apparatus 14. Alternatively in another example, the network traffic management apparatus 14 can determine when the received response is correct by comparing the received response with a stored response corresponding to the generated challenge in an active directory server 13, although the network traffic management apparatus 14 can use other techniques to determine if the received response is correct.

Accordingly in step 340, when the network traffic management apparatus 14 receives a failure message from the active directory server 13, then network traffic management apparatus 14 determines that the received response is incorrect then the No branch is taken to step 380 where the network traffic management apparatus 14 generates a 401 challenge to re authenticate the requesting one of the plurality of client computing devices 12(1)-12(n) to end the exemplary method.

However in step 340, when the network traffic management apparatus 14 receives a success message from the active directory server 13, then the network traffic management apparatus 14 determines that the response received from the requesting one of the plurality of client computing devices 12(1)-12(n) is correct and then the Yes branch is taken to the next step 345.

In step 345 the network traffic management apparatus 14 allows the requesting one of the plurality of client computing devices 12(1)-12(n) access to the requested web application in one of the plurality of web application servers 16(1)-16(n) as the requesting one of the plurality of client computing devices 12(1)-12(n) has been successfully NTLM authenticated and mark the connection as NTLM authenticated.

Next in step 350, the network traffic management apparatus 14 determines when there is a connection reset message from one of the plurality of web application servers 16(1)-16(n) for which is hosting the web application that is being used by the requesting one of the plurality of client computing devices 12(1)-12(n). In this example, the network traffic management apparatus 14 receives the connection reset message from one of the plurality of web applications when the plurality of web application servers 16(1)-16(n) is operating above a threshold level, unavailable web application in the plurality of web application servers 16(1)-16(n), internal error in the plurality of web application servers 16(1)-16(n), although the network traffic management apparatus 14 can receive the connection reset message for other conditions from the plurality of web application servers 16(1)-16(n). Accordingly, when the network traffic management apparatus 14 determines that there is no connection reset message from the plurality of web application servers 16(1)-16(n), then the No branch is taken back to step 345 where the network traffic management apparatus 14 continues to forward the received response back to the requesting one of the plurality of client computing devices 12(1)-12(n).

However if back in step 350, when the network traffic management apparatus 14 determines that it has received a connection reset request from one of the plurality of web application servers 16(1)-16(n), then the Yes branch is taken to step 355.

In step 355, the network traffic management apparatus 14 stores the challenge that was sent to the requesting one of the plurality of client computing devices 12(1)-12(n), response to the challenge that was received in the NTLM Type 3 authenticate request, the request URI and the SSL session ID in the memory of the network traffic management apparatus 14. Alternatively in another example, the network traffic management apparatus 14 can store this information at other memory locations. In this example, the network traffic management apparatus 14 stores the received response along with the SSL session id and the HTTP request URI in the memory 20 so that the network traffic management apparatus 14 can easily identify the received response when it is required to authenticate the requesting one of the plurality of client computing devices 12(1)-12(n) again on the next TCP connection but within the same SSL connection. In this example, the network traffic management apparatus 14 only stores the response along with the SSL session id and the HTTP request URI only when it receives the connection reset message from the plurality of web application servers 16(1)-16(n).

Next in step 360, the network traffic management apparatus 14 forwards the received connection reset from one of the plurality of web application servers 16(1)-16(n) to the requesting one of the plurality of client computing devices 12(1)-12(n).

In step 365, the network traffic management apparatus 14 receives the same HTTP Request with NTLM TYPE 3 message in a new TCP connection to access the web application in one of the plurality of web application servers 16(1)-16(n) from the requesting one of the plurality of client computing devices 12(1)-12(n), although the network traffic management apparatus 14 can receive other types of request from the requesting one of the plurality of client computing devices 12(1)-12(n).

Next in step 370, the network traffic management apparatus 14 determines when the received TYPE 3 HTTP request from the requesting one of the plurality of client computing devices 12(1)-12(n) is through the same SSL session through which all of the above illustrated requests-responses were exchanged and the requesting one of the plurality of client computing devices 12(1)-12(n) is trying to access the same web application using the same URI that was previously sent. In this example, the network traffic management apparatus 14 uses the information stored in the memory 20 to compare the recently received TYPE 3 HTTP GET request to determine if it is through the same SSL session, and trying to access the same web application with the URI and the request contains the same TYPE 3 HTTP request message, although the network traffic management apparatus 14 can make this determination using other techniques. Accordingly, when the network traffic management apparatus 14 determines that the recently received TYPE 3 HTTP GET request is either not in the same SSL session, or not accessing the same web application or using a different URI, then the No branch is taken back to step 320 where the network traffic management apparatus 14 sends a HTTP 401 response as previously illustrated above.

However if back in step 370, when the network traffic management apparatus 14 determines that the received TYPE 3 HTTP GET request from the requesting one of the plurality of client computing devices 12(1)-12(n) is through the same SSL session through which all of the above requests-responses were exchanged and the requesting one of the plurality of client computing devices 12(1)-12(n) is trying to access the same web application and using same URI and the TYPE 3 HTTP request message is the same as previous message, then the Yes branch is taken to step 375.

In step 375, the network traffic management apparatus 14 proceeds to allow the requesting one of the plurality of client computing devices 12(1)-12(n) to access the web application in one of the plurality of web application servers 16(1)-16(n) and marks the new TCP connection as NTLM authenticated. In this example, the network traffic management apparatus 14 uses the stored response to the challenge, SSL session id and same URI, to allow access to the requesting one of the plurality of client computing devices 12(1)-12(n), although the network traffic management apparatus 14 can use other types or amounts of information to allow the requesting one of the plurality of client computing devices 12(1)-12(n) to access the web application.

The exemplary method ends in step 380 when the requesting one of the plurality of client computing devices 12(1)-12(n) completes using the web application and terminates the TCP/IP connection and SSL session where the network traffic management apparatus 14 also deletes the stored information such as SSL session ID, TYPE 3 message and HTTP URI requesting the web application.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for secure sockets layer (SSL) protected network local area network manager (NTLM) re-authentication, the method implemented by a network traffic management system comprising one or more network traffic apparatuses, client devices, or server devices, the method comprising:
   receiving a recent request to access a network local area network manager (NTLM) protected web application on a new connection from a client as a response to a connection reset message in an existing session, the received recent request comprising network connection data;
   comparing the received network connection data to stored prior network connection data to determine when the received network connection data is identical; and
   re-authenticating the new connection and granting access to the requested NTLM protected web application executing on a web application server to the client in the existing session when the comparison indicates that the received network connection data is identical to the stored prior network connection data, wherein the client was previously authenticated to access the NTLM protected web application executing on the web application server.

2. The method as set forth in claim 1 wherein the network connection data comprises a current secured socket layer session identification number, a previously authenticated response to a previously sent challenge, and a hypertext transfer protocol uniform resource identifier of a resource being accessed on the web application server.

3. The method as set forth in claim 1 wherein the stored prior network connection data comprises a stored secured socket layer session identification number, a stored authenticated response to the previously sent challenge, and a stored hypertext transfer protocol uniform resource identifier.

4. The method as set forth in claim 1 further comprising receiving a request to access the web application from the client, the received request to access the NTLM protected web application comprising the stored secured socket layer session identification number, the stored authenticated response to the previously sent challenge, and the stored hypertext transfer protocol uniform resource identifier of the resource being accessed on the web application server.

5. The method as set forth in claim 4 further comprising:
   generating and sending a challenge responsive to the received request to access the web application to the client; and
   receiving a challenge response to the generated challenge.

6. The method as set forth in claim 5 further comprising:
   determining when the received answer is correct by sending and validating the generated challenge and the challenge response to an active directory server; and
   granting the client access to the requested NTLM protected web application when the received answer is determined to be correct.

7. The method as set forth in claim 1 wherein the determining further comprises, requesting the client to perform a new authentication when the network connection data is determined to be not identical to the stored prior network connection data.

8. A non-transitory computer readable medium having stored thereon instructions for secure socket layer (SSL) protected network local area network manager (NTLM) re-authentication comprising machine executable code which when executed by at least one processor, causes the processor to:
   receive a recent request to access a network local area network manager (NTLM) protected web application on a new connection from a client as a response to a connection reset message in an existing session, the received recent request comprising network connection data;
   compare the received network connection data to stored prior network connection data to determine when the received network connection data is identical; and
   re-authenticate the new connection and granting access to the requested NTLM protected web application executing on a web application server to the client in the existing session when the comparison indicates that the received network connection data is identical to the stored prior network connection data, wherein the client was previously authenticated to access the NTLM protected web application executing on the web application server.

9. The medium as set forth in claim 8 wherein the network connection data comprises a current secured socket layer session identification number, a previously authenticated response to a previously sent challenge, and a hypertext transfer protocol uniform resource identifier of a resource being accessed on the web application server.

10. The medium as set forth in claim 8 wherein the stored prior network connection data comprises a stored secured socket layer session identification number, a stored authenticated response to the previously sent challenge, and a stored hypertext transfer protocol uniform resource identifier.

11. The medium as set forth 8 further comprising receiving a request to access the NTLM protected web application from the client, the received request to access the web application comprising the stored secured socket layer session identification number, the stored authenticated response to the previously sent challenge, and the stored hypertext transfer protocol uniform resource identifier of the resource being accessed on the web application server.

12. The medium as set forth in claim 11 further comprising:
   generating and sending a challenge responsive to the received request to access the web application to the client; and
   receiving a challenge response to the generated challenge.

13. The medium as set forth in claim 12 further comprising:
   determining when the received answer is correct by sending and validating the generated challenge and the received challenge response to an active directory server; and
   granting the client access to the requested NTLM protected web application when the received answer is determined to be correct.

14. The medium as set forth in claim 8 wherein the determining further comprises, requesting the client to perform a new authentication when the network connection data is determined to be not identical to the stored prior network connection data.

15. A network traffic management device comprising:
   a memory including programmed instructions stored in the memory and one or more processors configured to be capable of executing the programmed instructions stored in the memory to:
      receive a recent request to access a network local area network manager (NTLM) protected web application on a new connection from a client as a response to a connection reset message in an existing session, the received recent request comprising network connection data;
      compare the received network connection data to stored prior network connection data to determine when the received network connection data is identical; and
      re-authenticate the new connection and granting access to the requested NTLM protected web application executing on a web application server to the client in the existing session when the comparison indicates that the received network connection data is identical to the stored prior network connection data, wherein the client was previously authenticated to access the NTLM protected web application executing on the web application server.

16. The device as set forth in claim 15 wherein the network connection data comprises a current secured socket layer session identification number, a previously authenticated response to a previously sent challenge, and a hypertext transfer protocol uniform resource identifier of a resource being accessed on the web application server.

17. The device as set forth in claim 15 wherein the stored prior network connection data comprises a stored secured socket layer session identification number, a stored authenticated response to the previously sent challenge, and a stored hypertext transfer protocol uniform resource identifier.

18. The device as set forth in claim 15 wherein the one or more processors are further configured to be capable of executing the programmed instructions stored in the memory to receive a request to access the NTLM protected web application from the client, the received request to access the web application comprising the stored secured socket layer session identification number, the stored authenticated response to the previously sent challenge, and the stored hypertext transfer protocol uniform resource identifier of the resource being accessed on the web application server.

19. The device as set forth in claim 18 wherein the one or more processors are further configured to be capable of executing the programmed instructions stored in the memory to:
   generate and send a challenge responsive to the received request to access the web application to the client; and
   receive a challenge response to the generated challenge.

20. The device as set forth in claim 19 wherein the one or more processors are further configured to be capable of executing the programmed instructions stored in the memory to:
   determine when the received answer is correct by sending and validating the generated challenge and the received challenge response to an active directory server; and
   grant the client access to the requested NTLM protected web application when the received answer is determined to be correct.

21. The device as set forth in claim 15 wherein the one or more processors are further configured to be capable of executing the programmed instructions stored in the memory wherein the determining further comprises, request the client to perform a new authentication when the network connection data is determined to be not identical to the stored prior network connection data.

22. A network traffic management system comprising:
   one or more traffic management apparatuses, client devices, or server devices comprising memory comprising programmed instructions stored thereon and one or more processors configured to be capable of executing the stored programmed instructions to:
      receive a recent request to access a network local area network manager (NTLM) protected web application on a new connection from a client as a response to a forwarded connection reset message in an existing session, the received recent request comprising network connection data;
      compare the received network connection data to stored prior network connection data to determine when the received network connection data is identical; and
      re-authenticate the new connection and granting access to the requested NTLM protected web application executing on a web application server to the client in the existing session when the comparison indicates that the received network connection data is identical to the stored prior network connection data, wherein the client was previously authenticated to access the NTLM protected web application executing on the web application server.

* * * * *